(12) United States Patent
Higuchi et al.

(10) Patent No.: US 7,240,138 B2
(45) Date of Patent: Jul. 3, 2007

(54) DATA TRANSFER CONTROL APPARATUS

(75) Inventors: Ryohei Higuchi, Tokyo (JP); Toshiyuki Hiraki, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 432 days.

(21) Appl. No.: 10/689,668

(22) Filed: Oct. 22, 2003

(65) Prior Publication Data
US 2004/0205278 A1  Oct. 14, 2004

(30) Foreign Application Priority Data
Apr. 14, 2003  (JP) .............................. 2003-109341

(51) Int. Cl.
*G06F 13/14* (2006.01)
*G06F 13/00* (2006.01)
(52) U.S. Cl. ................... 710/305; 710/110; 710/316
(58) Field of Classification Search ................... None
See application file for complete search history.

(56) References Cited

U.S. PATENT DOCUMENTS

| 3,573,741 | A | * | 4/1971 | Gavril ........................ 710/5 |
| 4,912,633 | A | * | 3/1990 | Schweizer et al. .......... 710/110 |
| 5,029,074 | A | * | 7/1991 | Maskas et al. .............. 710/306 |
| 5,566,350 | A | * | 10/1996 | Takagi et al. ............... 710/22 |
| 7,058,740 | B2 | * | 6/2006 | Watanabe et al. ........... 710/110 |
| 7,162,556 | B2 | * | 1/2007 | Fujiki ........................ 710/110 |
| 2004/0103230 | A1 | * | 5/2004 | Emerson et al. ............ 710/110 |
| 2004/0177205 | A1 | * | 9/2004 | Schoner ...................... 710/305 |
| 2005/0289268 | A1 | * | 12/2005 | Miller ......................... 710/110 |

FOREIGN PATENT DOCUMENTS

| JP | 5-46538 | 2/1993 |
| JP | 5-210616 | 8/1993 |
| JP | 2002-7313 | 1/2002 |

OTHER PUBLICATIONS

Patent Office of the People's Republic of China. Office Action dated Oct. 14, 2005. China Patent Application No. 200410002758.5 filed on Jan. 14, 2004. Renesas Technology Corp. 5 pages.
Patent Office of the People's Republic of China. Office Action dated Oct. 14, 2005. English Translation. China Patent Application No. 200410002758.5 filed on Jan. 14, 2004. Renesas Technology Corp. 5 pages.

* cited by examiner

*Primary Examiner*—Glenn A. Auve
*Assistant Examiner*—Nimesh Patel
(74) *Attorney, Agent, or Firm*—Buchanan Ingersoll & Rooney PC

(57) ABSTRACT

A data transfer control apparatus has a plurality of bus slaves connected to a bus master via a bus interface unit for RAM connected to the bus master via a master bus, and a transfer bus which connects the first bus slave and plural second bus slaves in the plurality of bus slaves. When an instruction to execute data transfer via the transfer bus is given by a transfer instruction signal, data transfer between one second bus slave selected from the plural second bus slaves and the first bus slave via the transfer bus is carried out in response to a control signal contained in a control signal bus on a slave bus for RAM.

9 Claims, 21 Drawing Sheets

RAM ADDRESS SPACE

FIG.12

| CLK SIGNAL LINES | 1 2 3 4 5 6 7 8 9 10 11 12 13 14 15 16 17 18 |
|---|---|
| MASTER BUS | |
| REQ (3) | Ra Ra Ra Ra _ Rb Rb Rb Rb |
| ACK (3) | Ra Ra Ra Ra _ Rb Rb Rb Rb |
| END (3) | Ra Ra Ra Ra _ Rb Rb Rb Rb |
| RW (3) | |
| MADDR (2) | X Ra Ra Ra Ra XX Rb Rb Rb Rb XXXXXXXXXXXXXXXX |
| MDR_R (5) | XXXXXXXXXXXXXXXXXXXXXXXXXXXXXXXXXX |
| MDW (4) | XXXXXXXXXXXXXXXXXXXXXXXXXXXXXXXXXX |
| RAM SLAVE BUS | |
| RCS (15) | Ra Ra Ra Ra _ Rb Rb Rb Rb |
| RRW (15) | |
| RADDR (12) | X Ra Ra Ra Ra XX Rb Rb Rb Rb XXXXXXXXXXXXXXXX |
| RDR (13) | XX Ra Ra Ra Ra XX Rb Rb Rb Rb XXXXXXXXXXXXXXX |
| RDW (14) | XXXXXXXXXXXXXXXXXXXXXXXXXXXXXXXXXX |
| TRANSFER INSTRUCTION SIGNAL (55) | CHANNEL 0 TRANSFER ⟷ CHANNEL 1 TRANSFER |
| SELa (56a) | |
| SELb (56b) | |
| TRANSFER BUS | |
| RS (63) | |
| WS (63) | Wa Wa Wa Wa _ Wb Wb Wb Wb |
| TDR (67) | XXXXXXXXXXXXXXXXXXXXXXXXXXXXXXXXXX |
| TDW (64) | XXX Wa Wa Wa Wa XX Wb Wb Wb Wb XXXXXXXXXXXXXX |

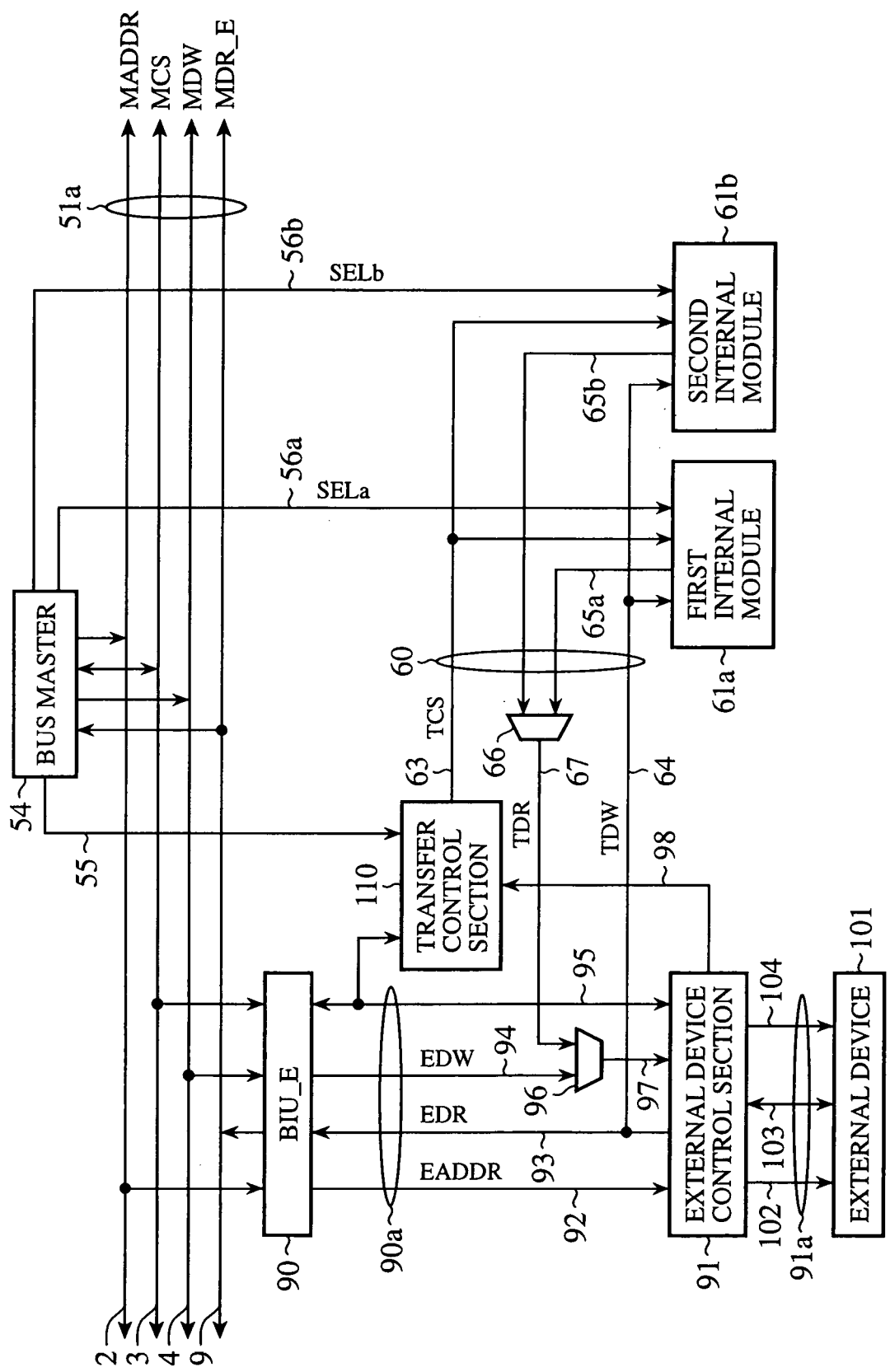

RAM ADDRESS SPACE

IO ADDRESS SPACE

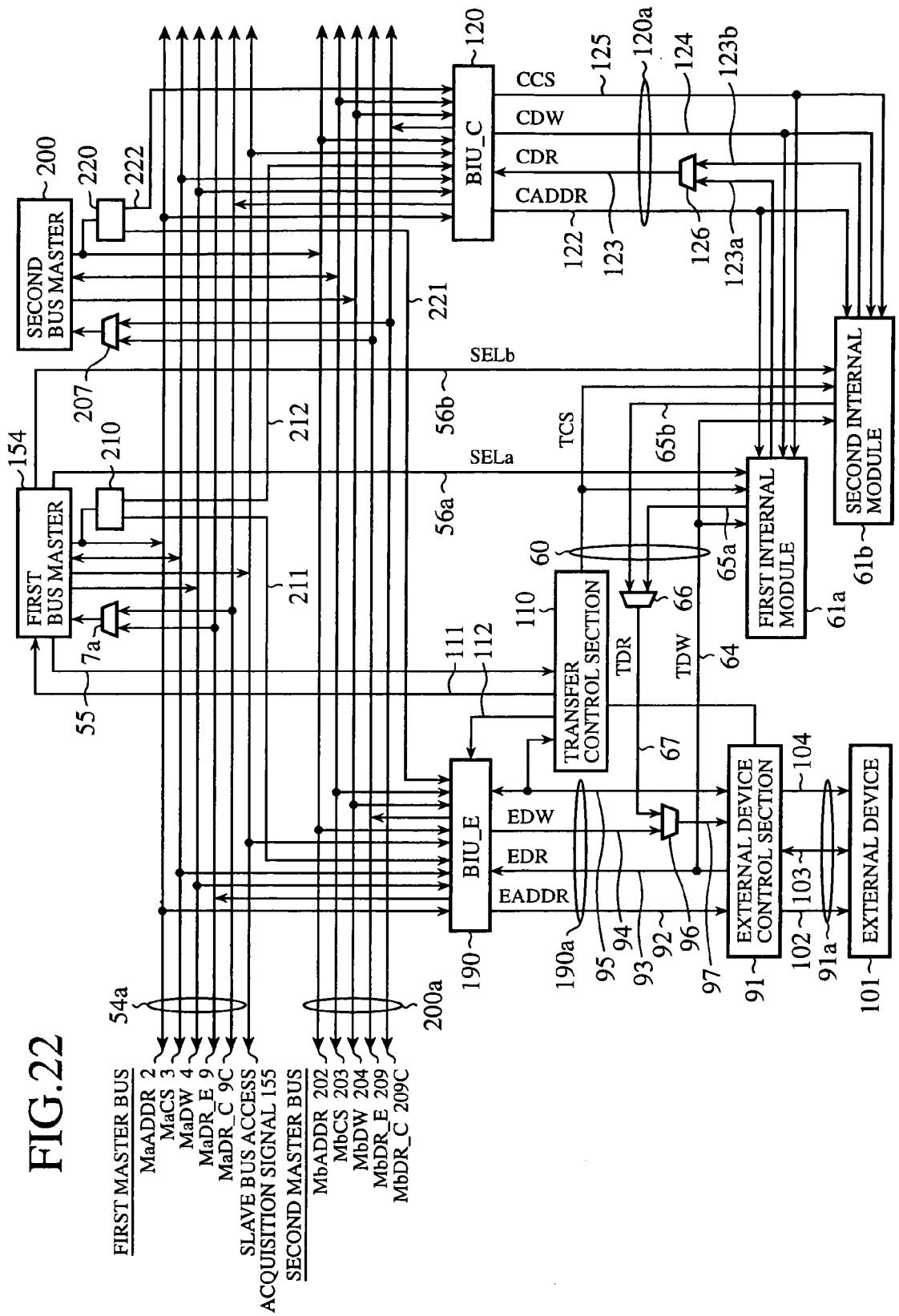

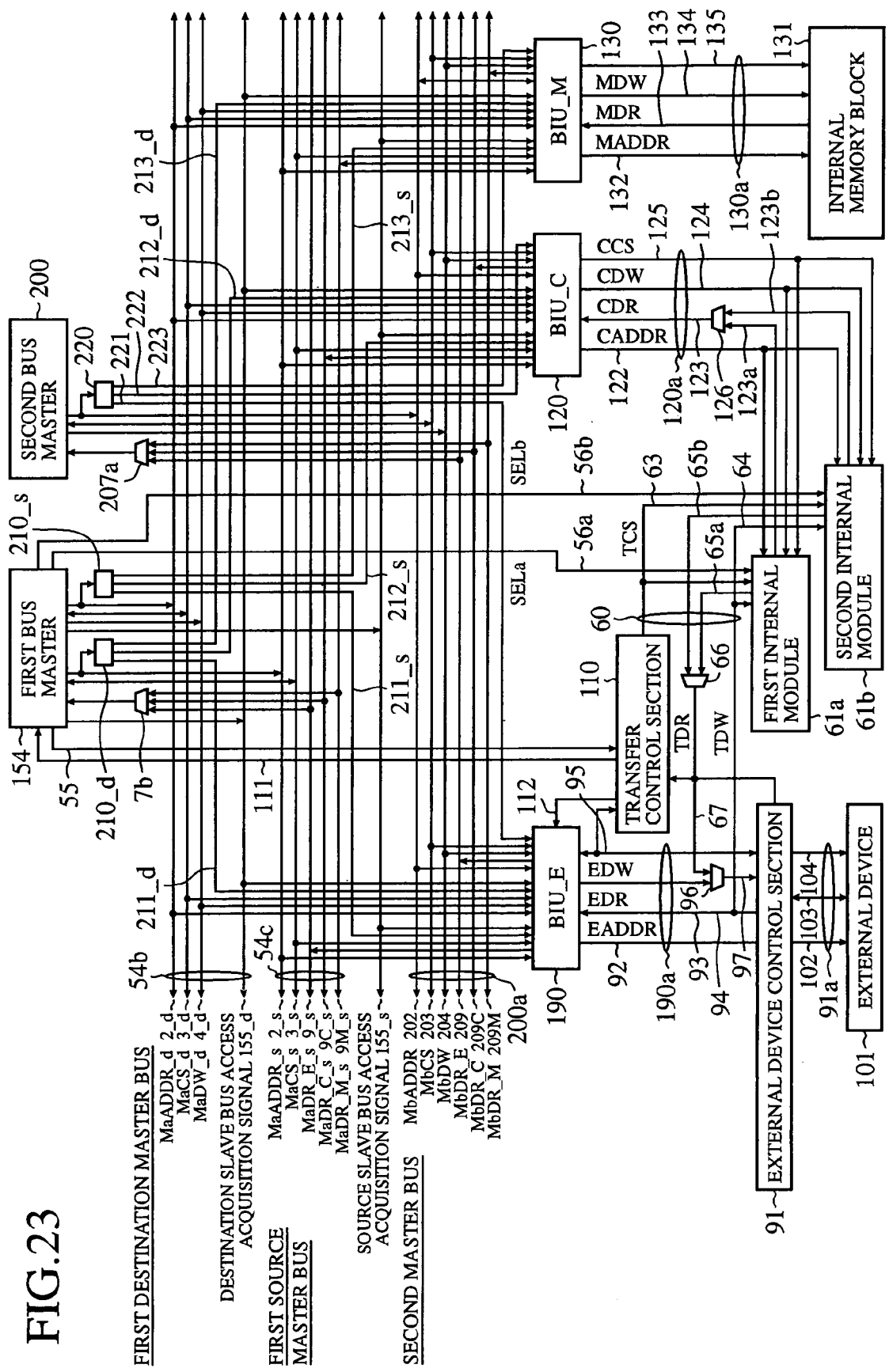

DATA TRANSFER CONTROL APPARATUS

BACKGROUND OF THE INVENTION

1. Field of the Invention

The present invention relates to a data transfer control apparatus which controls data transfer to be executed among a plurality of modules formed inside, for example, a system LSI.

2. Description of the Related Art

There has been known a data transfer control apparatus which is constructed inside a system LSI. This data transfer control apparatus has a plurality of bus interface units connected to a bus master via a master bus, and a plurality of bus slaves respectively connected to the bus interface units via a slave bus. The bus master is constituted by, for example, a DMA (Direct Memory Access) transfer controller. Each of the bus slaves is constituted by, for example, a RAM (Random Access Memory), an input/output module or the like.

The data transfer control apparatus executes data transfer from an input/output module or one bus slave to a RAM or another bus slave in the following manner. First, the DMA transfer controller or the bus master sends a request to a bus arbiter to acquire a bus access to access an input/output module, then fetches data from the input/output module over the slave bus, the bus interface unit and the master bus. Next, the DMA transfer controller sends a request to the bus arbiter to acquire a bus access to access the RAM, then transfers and writes the data, fetched from the input/output module, into the RAM.

Patent Document 1 (Japanese Patent Laid-Open No. 46538/1993) discloses, as a related art, a bus control system which has bus control means, intervened between a common bus and a microprocessor and an additional function circuit unit, for controlling transfer of data or a command on the common bus, issues a no-operation instruction to the microprocessor when the instruction of the microprocessor is fetched and transfers the fetched data or command to the additional function circuit unit without going through the microprocessor. This bus control system can carry out transfer of data or a command to the additional function circuit unit efficiently and eventually contribute to improving the system performance.

Patent Document 2 (Japanese Patent Laid-Open No. 210616/1993) discloses a computer device that has a ROM (Read Only Memory) to store instructions, RAM to store data, a CPU (Central Processing Unit) and an input/output device. The RAM is accessible to a peripheral circuit at the timing of fetching an instruction by the CPU or in an instruction fetch period so that the peripheral circuit can access the RAM without intercepting the execution of an instruction by the CPU via a bus for the RAM. Because the computer device can execute a DMA operation at the timing of instruction fetching in transferring data between the RAM and the peripheral device in the DMA system, execution of an instruction is not intercepted with, thus preventing contention of an access to the RAM by the CPU and the peripheral circuit.

Patent Document 3 (Japanese Patent Laid-Open No. 2002-7313) discloses a data processing device. In the data processing device, a master executes data exchange with individual modules on first and second external buses and executes data exchange among modules on the first and second external buses. The master sends a transmitting side and a receiving side address information via the external buses to allow a direct exchange of data among modules on the same external bus or different external buses. Through this structure, it permits communications among the individual modules via the minimum wiring of the buses and ensures an operation under low power consumption.

In case where the conventional data transfer control apparatuses perform data transfer, however, it is necessary to serially execute a sequence of operations, acquisition of a bus access, data reading, acquisition of a bus access, data writing, thus requiring multiple cock cycles to do those operations. As a result, data transfer unexpectedly takes a lot of time, thereby decreasing efficiency.

SUMMARY OF THE INVENTION

The invention has been made to solve the aforementioned problems and an object thereof is to provide a data transfer control apparatus which can execute data transfer efficiently and quickly in fewer clock cycles.

To achieve this object, a data transfer control apparatus according to the invention includes a plurality of bus slaves connected to a bus master via a bus interface unit connected to the bus master via a master bus, and a transfer bus which connects the first bus slave and plural second bus slaves in the plurality of bus slaves. When an instruction to execute data transfer via the transfer bus is given by a transfer instruction signal, data transfer between one second bus slave selected from the plural second bus slaves and the first bus slave via the transfer bus is carried out in response to a control signal output on a slave bus.

As mentioned above, according to the invention, as data transfer via an exclusive transfer bus is performed between the first bus slave and a selected one of a plurality of second bus slaves in accordance with an instruction from the bus master, data to be transferred does not go through the bus master. This reduces the number of clock cycles for transfer through the bus master and thus ensures efficient and fast data transfer in fewer clock cycles.

BRIEF DESCRIPTION OF THE DRAWINGS

FIG. 12 is a timing chart for explaining the operation of the data transfer control apparatus shown in FIG. 11;

FIG. 13 is a block diagram showing the configuration of a data transfer control apparatus according to a fifth embodiment of the invention;

FIG. 22 is a block diagram showing the configuration of a data transfer control apparatus according to a tenth embodiment of the invention; and FIG. 23 is a block diagram showing the configuration of a modification of the data transfer control apparatus according to the tenth embodiment of the invention.

DETAILED DESCRIPTION OF THE PREFERRED EMBODIMENTS

Figure 1:
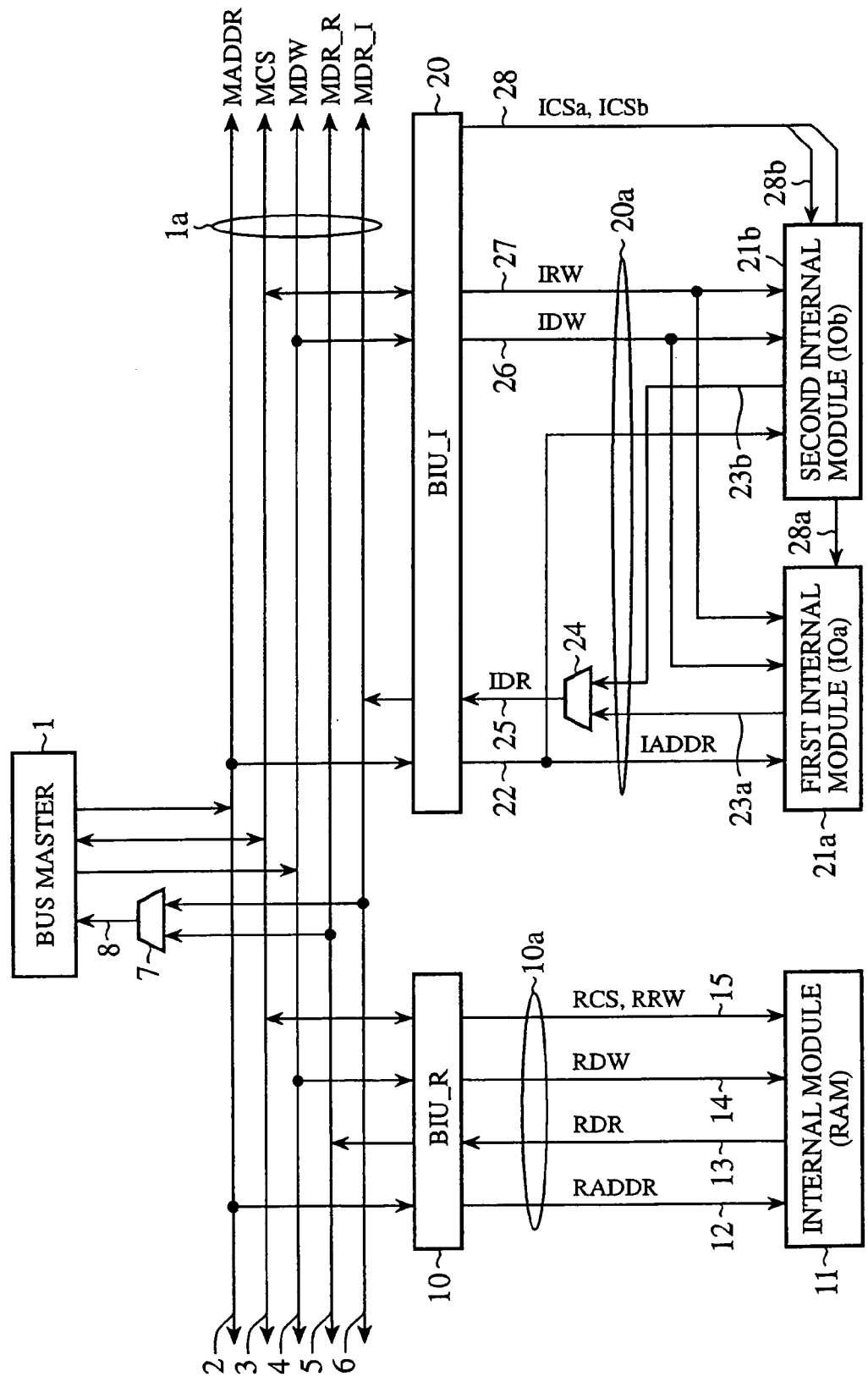
FIG. 1 is a block diagram showing the configuration of a commonly used data transfer control apparatus.

Preferred embodiments of the invention will be described in detail below with reference to the accompanying drawings. The same reference numeral employed in various embodiments indicate the same component in the following description.

To help easy understanding of the invention and comparison with the invention, a discussion will be first made on a commonly used data transfer control apparatus.

FIG. 1 is a block diagram showing the configuration of a commonly used data transfer control apparatus which is formed inside a system LSI. This data transfer control apparatus has three internal modules 11, 21a and 21b which function as bus slaves. The internal module 11 is constituted by a random access memory (RAM) and will be hereinafter called "RAM 11". The internal module 21a is constituted by (10a) and will be hereinafter called "first internal module 21a". The internal module 21b is likewise constituted by an is constituted by (10b) and will be hereinafter called "second internal module 21b".

The data transfer control apparatus comprises, as main components, a bus master 1, a master bus 1a, a bus interface unit for RAM (hereinafter referred to as "BIU_R") 10, a slave bus for RAM (hereinafter referred to as "RAM slave bus") 10a, the RAM 11, a bus interface unit for IO (hereinafter referred to as "BIU_I") 20, a bus slave for IO (hereinafter referred to as "ID slave bus") 20a, the first internal module 21a and the second internal module 21b.

The bus master 1 performs data transfer between it and the RAM 11 via the BIU_R 10 and does data transfer between it and the first internal module 21a or the second internal module 21b via the BIU_I 20. The bus master 1 is connected to the master bus 1a.

The master bus 1a includes a master address bus 2, a master control signal bus 3, a master write data bus 4, a read data bus for RAM (hereinafter referred to as "RAM read data bus") 5 and a read data bus (hereinafter referred to as "IO read data bus") 6.

The master address bus 2 is used to send a master address signal MADDR, output from the bus master 1, to the BIU_R 10 and the BIU_I 20. The master control signal bus 3 is used to send a master control signal MCS, output from the bus master 1, to the BIU_R 10 and the BIU_I 20. The master control signal MCS includes an access request signal REQ, an access acknowledge signal ACK, an access end signal END and a master read/write signal RW. The access request signal REQ is a request from the bus master 1 to access the BIU_R 10 and the BIU_I 20. The access acknowledge signal ACK is an ANDed signal of those signals from the BIU_R 10 and the BIU_I 20 which indicate that they are accessible. The access end signal END is an ANDed signal of those signals output from the BIU_R 10 and the BIU_I 20 which indicate the end of an access. The master read/write signal RW is a signal indicating whether the bus master 1 performs a read access or a write access.

The master write data bus 4 is used to send master write data MDW, output from the bus master 1, to the BIU_R 10 and the BIU_I 20. The RAM read data bus 5 is used to send master read data MDR_R, sent via the BIU_I 20 from the RAM 11, to a selector 7. The IO read data bus 6 is used to send master read data MDR_R, sent via the BIU_I 20 from the first internal module 21a or the second internal module 21b, to the selector 7.

The RAM read data bus 5 and the IO ead data bus 6 are connected to the input terminal of the selector 7 whose output terminal is connected to the bus master 1 by a master read data bus 8. The selector 7 selects either the master read data MDR_R sent over the RAM read data bus 5 or the master read data MDR_I sent over the IO read data bus 6 and outputs the selected data as master read data to the master read data bus 8.

To access the RAM 11, the BIU_R 10 mutually converts the protocol of the master bus 1a and that of the RAM slave bus 10a. The BIU_R 10 is connected to the RAM 11 via the RAM slave bus 10a.

The RAM slave bus 10a includes a RAM address bus 12, a RAM read data bus 13, a RAM write data bus 14 and a RAM control signal bus 15.

The RAM address bus 12 is used to send a RAM address signal RADDR, output from the BIU_R 10, to the RAM 11. The RAM read data bus 13 is used to send RAM read data RDR, read from the RAM 11, to the BIU_R 10. The RAM write data bus 14 is used to send RAM write data RDW, output from the BIU_R 10, to the RAM 11.

The RAM control signal bus 15 is used to send a RAM chip select signal RCS and a RAM read/write signal RRW, output as RAM control signals RCS from the BIU_R 10, to the RAM 11. The RAM read/write signal RRW is a signal indicating whether a read access or a write access is to be made to the RAM 11.

To access the first internal module 21a and the second internal module 21b, the BIU_R 10 mutually converts the protocol of the master bus 1a and that of the ID slave bus 20a. The BIU_I 20 is connected to the first internal module 21a and second internal module 21b via the ID slave bus 20a.

The ID slave bus 20a comprises an IO address bus 22, a first IO read data bus 23a, a second IO read data bus 23b, an IO write data bus 26 and an IO control signal bus 27.

The IO address bus 22 is used to send an IO address signal IADDR from the BIU_I 20 to the first internal module 21a and the second internal module 21b. The first IO read data bus 23a is used to send first IO read data, read from the first internal module 21a, to a selector 24. The second IO read data bus 23b is used to send second IO read data, read from the second internal module 21b, to the selector 24. The IO write data bus 26 is used to send IO write data IDW from the BIU_I 20 to the first internal module 21a and the second internal module 21b. The IO control signal bus 27 is used to send an IO read/write signal IRW, output from the BIU_I 20, to the first internal module 21a and the second internal module 21b.

The output terminal of the selector 24 is connected to the BIU_I 20 by an IO read data bus 25. The selector 24 selects either the first IO read data sent from the first IO read data bus 23a or the second IO read data sent from the second IO read data bus 23b depending on which one of a first chip select signal ICSa and the second chip select signal ICSb is active, and sends the selected data to the IO read data bus 25.

A first IO select signal line 28a and a second IO select signal line 28b both extending from the BIU_I 20 are respectively connected to the first internal module 21a and the second internal module 21b. The first IO select signal line 28a is used to send the first chip select signal ICSa which causes the BIU_I 20 to select the first internal module 21a. The second IO select signal line 28b is used to send the second chip select signal ICSb which causes the BIU_I 20 to select the second internal module 21b.

The operation of the ordinary data transfer control apparatus thus configured as above will then be described. Hereupon, a reference will first be made to the general operation of the data transfer control apparatus.

The following will discuss the case where data stored in the RAM 11 is transferred to the first internal module 21a as one example of the operation of the data transfer control apparatus. The operation of the data transfer control apparatus involves a read operation for the bus master 1 to read data from the RAM 11 and a write operation for the bus master 1 to write data in the first internal module 21a.

To begin with, the read operation for the bus master 1 to read data from the RAM 11 will be discussed. The bus master 1 outputs the master control signal MCS necessary to read data to the master control signal bus 3. Simultaneously, the bus master 1 outputs the master address signal MADDR, which indicates the read start position in the RAM 11, to the master address bus 2. When the master control signal MCS is output to the master control signal bus 3, the BIU_R 10 checks if the master address signal MADDR output to the master address bus 2 specifies the RAM 11. When it is turned out that the master address signal MADDR specifies the RAM 11, and in turn the BIU_R 10 executes a data read protocol on the RAM slave bus 10a.

Namely, the BIU_R 10 outputs the RAM control signal RCS needed to read data from the RAM 11 to the RAM control signal bus 15. Simultaneously, the BIU_R 10 outputs the master address signal MADDR indicative of the read start position in the RAM 11 to the master address bus 2 as the RAM read data RDR. As a result, data is read from the RAM 11 and output to the RAM read data bus 13 as the RAM read data RDR. The BIU_R 10 outputs the RAM read data RDR sent via the RAM read data bus 13 to the RAM read data bus 5 in the master bus 1a as the master read data MDR_R.

At the time the bus master 1 accesses the RAM 11, the selector 7 is so controlled as to select the RAM read data bus 13 by a control section (not shown). Therefore, the selector 7 selects the master read data MDR_R output to the RAM read data bus 5 and outputs the selected data as master read data to the master read data bus 8. The bus master 1 fetches the master read data from the master read data bus 8. Thus, the read operation for the bus master 1 to read data from the RAM 11 is completed.

Next, the write operation for the bus master 1 to write data in the first internal module 21a will be discussed. The bus master 1 outputs the master control signal MCS needed to write data to the master control signal bus 3. Simultaneously, the bus master 1 outputs an address allocated to the first internal module 21a to the master address bus 2 as the master address signal MADDR. Further, the bus master 1 outputs data, previously read from the RAM 11, to the master write data bus 4 as the master write data MDW.

Upon the master control signal MCS is output to the master control signal bus 3, the BIU_I 20 checks if the master address signal MADDR output to the master address bus 2 specifies the first internal module 21a. When it is reveled that the master address signal MADDR specifies the first internal module 21a, and in turn the BIU_I 20 executes a data write protocol on the ID slave bus 20a.

Namely, the BIU_I 20 makes the first chip select signal ICSa active, which is output to the first IO select signal line 28a. Accordingly, the first internal module 21a is selected and becomes operable. Simultaneously, the BIU_I 20 outputs the IO read/write signal IRW needed to write data to the IO control signal bus 27. The BIU_I 20 also outputs the IO address signal IADDR, which specifies a data write position, to the RAM address bus 12. Further, the BIU_I 20 outputs the master write data MDW sent from the master write data bus 4 to the IO write data bus 26 as the IO write data IDW. As a result, data sent from the bus master 1 is written in the first internal module 21a. Thus, the write operation for the bus master 1 to write data in the first internal module 21a is completed. Since the read operation and write operation are done, an operation of transferring a single-piece of data stored in the RAM 11 to the first internal module 21a is completed.

Figure 2:
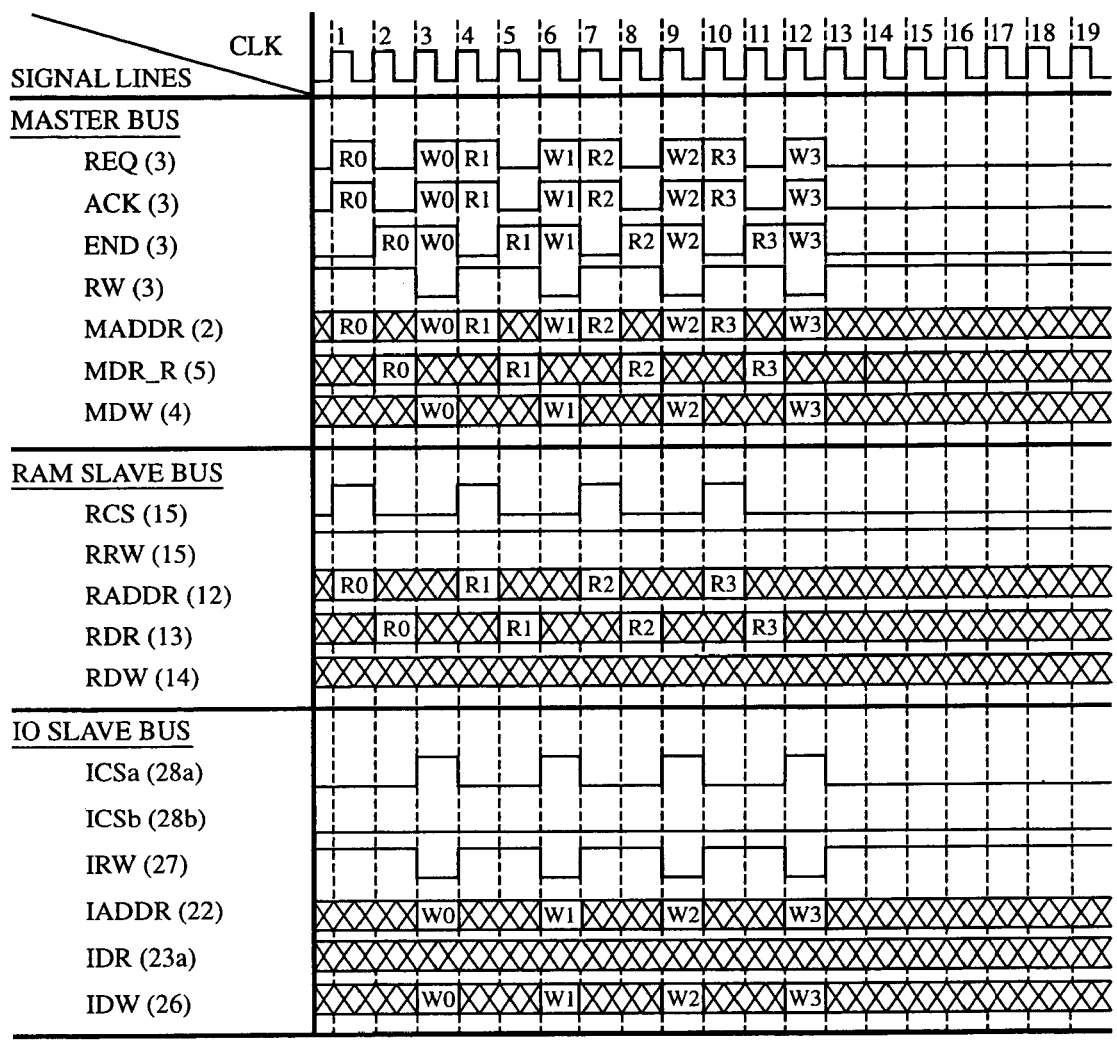
FIG. 2 is a timing chart for explaining the operation of the data transfer control apparatus shown in FIG. 1.

The operation of the data transfer control apparatus will be further discussed in detail referring to a timing chart shown in FIG. 2.

FIG. 2 illustrates timings in case of transferring four pieces of data from the RAM 11 to the first internal module 21a. In FIG. 2, R0 to R3 represent signals associated with the read operation for four pieces of data which are executed at the time of data transfer, and W0 to W3 represent signals associated with the write operation for four pieces of data which are executed at the time of data transfer. Those signals R0 to R3 and W0 to W3 will be commonly used in other timing charts that will be mentioned later.

In a clock cycle (hereinafter abbreviated as "CLK") "1", the bus master 1 asserts the access request signal REQ, the master read/write signal RW and the master address signal MADDR. The master read/write signal RW represents "read" at a high level (hereinafter called "H level") and "write" at a low level (hereinafter called "L level"). since the BIU_R 10 determines that an address for the RAM 11 is output and the RAM 11 is an acknowledgeable state by checking the master address signal MADDR output to the master address bus 2, the BIU_R 10 asserts the access acknowledge signal ACK within the CLK "1". Within the CLK "1", the BIU_R 10 also asserts the RAM control signal RCS, the RAM address signal RADDR and the RAM read/write signal RRW to send a read request to the RAM 11. The RAM read/write signal RRW represents "read" at an H level and "write" at an L level.

The RAM read data RDR read from the RAM 11 in response to the read request is output to the RAM read data bus 13 within CLK "2" of the read request. Within the CLK "2", the RAM read data RDR output to the RAM read data bus 13 is output to the RAM read data bus 5 as the master read data MDR_R. Simultaneously, the BIU_R 10 asserts the access end signal END.

The master read data MDR_R output to the RAM read data bus 5 is selected by the selector 7 and output to the master read data bus 8 within the CLK "2". The master read data MDR_R output to the master read data bus 8 is fetched in the bus master 1 within the CLK "2". Thus, the read operation for the bus master 1 to read data from the RAM 11 is completed.

Within the next CLK "3", the bus master 1 outputs the fetched read data to the master write data bus 4 as the master write data MDW. Simultaneously, the bus master 1 asserts the access request signal REQ, the master address signal MADDR and the master read/write signal RW.

Upon the BIU_I 20 determines that an address for the first internal module 21a is output and the first internal module 21a is in an operational state by checking the master address signal MADDR output to the master address bus 2, the BIU_I 20 asserts the access acknowledge signal ACK within the CLK "3". Within the CLK "3", the BIU_I 20 asserts the first chip select signal ICSa and IO read/write signal IRW. Further, the BIU_I 20 outputs the IO address signal IADDR to the IO address bus 22 and outputs the IO write data IDW to the IO write data bus 26, thereby sending a write request to the first internal module 21a. The IO read/write signal IRW represents "read" at an H level and "write" at an L level. Accordingly, the IO write data IDW is written at the position specified by the IO address signal IADDR. Thus, the write operation for the bus master 1 to write data in the first internal module 21a is completed, and thus ultimately the operation of transferring a single piece of data stored in the RAM 11 to the first internal module 21a. Thereafter, second to fourth data are likewise transferred.

Data transfer from the first internal module 21a to the RAM 11 involves an operation for the bus master 1 to read data from the first internal module 21a and an operation for the bus master 1 to write data in the RAM 11. Since those operations are similar to those of transferring data from the RAM 11 to the first internal module 21a, their descriptions will not be repeated.

The data transfer control apparatus requires twelve clock cycles to transfer four pieces of data from the RAM 11 to the first internal module 21a.

First Embodiment

Figure 3:
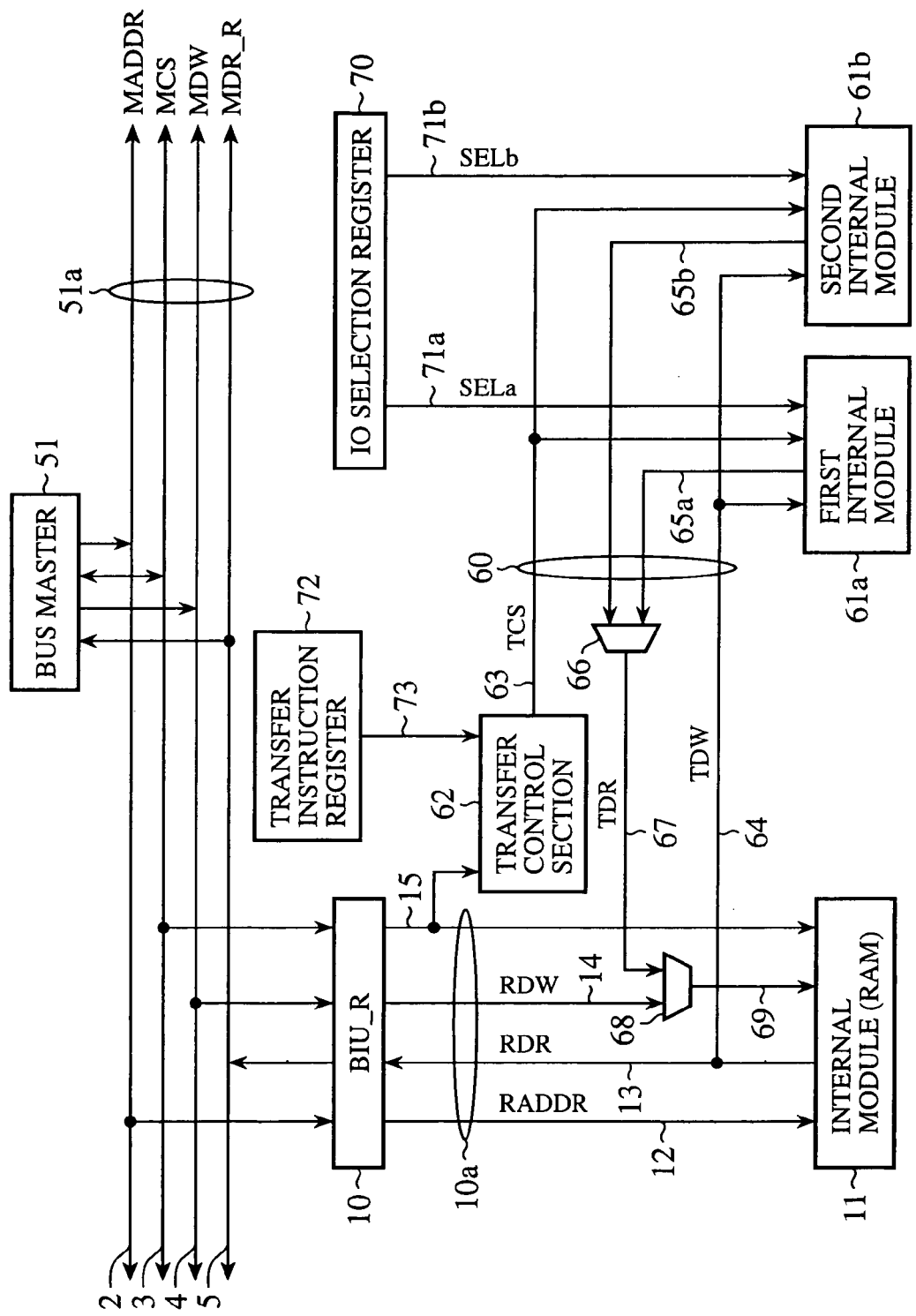
FIG. 3 is a block diagram showing the configuration of a data transfer control apparatus according to a first embodiment of the invention.

A data transfer control apparatus according to the first embodiment of the invention will then be discussed. This data transfer control apparatus is so designed as to execute data transfer among a plurality of internal modules provided in an LSI, which functions as a bus slave, via a transfer bus. To avoid the redundant description, the same reference numeral indicates the same or similar component of the data transfer control apparatus shown in FIG. 1, and therefore descriptions thereof are omitted for brevity's sake, FIG. 3 is a block diagram showing the configuration of the data transfer control apparatus according to the first embodiment of the invention. The data transfer control apparatus is constructed by removing the bus master 1, the IO read data bus 6, the selector 7, the BIU_I 20, the first internal module 21a, the second internal module 21b, the selector 24 and the lines that belong to those components and by adding instead a bus master 51, a first internal module 61a, a second internal module 61b, a transfer control section 62, a selector 66, a selector 68, an IO selection register 70 and a transfer instruction register 72.

The bus master 51 accesses the RAM 11, the first internal module 61a and the second internal module 61b via the BIU_R 10, exchanges data with them and executes data transfer between the RAM 11 and the first internal module 61a or the second internal module 61b. The bus master 51 is connected to a master bus 51a.

As mentioned above, the master bus 51a is the same as the master bus 1a shown in FIG. 1 except that it is devoid of the IO read data bus 6. The RAM read data bus 5 sends master read data MDR_R sent from the BIU_R 10 as master read data to the bus master 51 directly (without intervention of the selector shown in FIG. 1).

The first internal module 61a is the same as the first internal module 21a shown in FIG. 1 except that it is selected by a first select signal SELa sent from the IO selection register 70. Likewise, the second internal module 61b is the same as the second internal module 21b shown in FIG. 1 except that it is selected by a second select signal SELb sent from the IO selection register 70.

The transfer control section 62 generates a transfer control signal TCS for controlling data transfer between the RAM 11 and the first internal module 61a or the second internal module 61b based on a RAM control signal RCS from the RAM control signal bus 15 and a transfer instruction signal from the transfer instruction register 72. The generated transfer control signal TCS is sent to the first internal module 61a and the second internal module 61b via a transfer control signal bus 63. The transfer control signal TCS contains an IO read strobe signal RS which indicates a read timing to the first internal module 61a and the second internal module 61b and an IO write strobe signal WS indicative of a write timing to the first internal module 61a and the second internal module 61b.

A transfer bus 60 includes the transfer control signal bus 63, an IO write data bus 64, a first IO read data bus 65a and a second IO read data bus 65b.

The IO write data bus 64 connects the RAM read data bus 13 to the first internal module 61a and the second internal module 61b. The IO write data bus 64 is used to send RAM read data RDR, read from the RAM 11, as transfer write data TDW to the first internal module 61a and the second internal module 61b. The first IO read data bus 65a is used to send first IO read data, read from the first internal module 61a, to the selector 66. The second IO read data bus 65b is used to send second IO read data, read from the second internal module 61b, to the selector 66.

The output terminal of the selector is connected to one input terminal of the selector 68 by an IO read data bus 67. The selector 66 selects either the first IO read data sent from the first IO read data bus 65a or the second IO read data sent from the second IO read data bus 65b depending on which one of the first select signal SELa and the second select signal SELB is active, and outputs the selected read data as transfer read data TDR.

The IO read data bus 67 is used to send the transfer read data TDR, output from the selector 66, to the selector 68. The other input terminal of the selector 68 is connected to the BIU_R 10 by the RAM write data bus 14. The RAM write data bus 14 is used to send RAM write data RDW from the BIU_R 10 to the selector 68. The output terminal of the selector 68 is connected to the RAM 11 by a RAM write data bus 69. The selector 68 selects either the transfer read data TDR sent from the IO read data bus 67 or the RAM write data RDW sent from the RAM write data bus 14 depending on whether it is data transfer via the transfer bus 60 or data transfer by the bus master 51, and sends the selected data as RAM write data to the RAM 11 via the RAM write data bus 69.

The IO selection register 70 holds a value for determining which one of the first internal module 61a and the second internal module 61b is to be selected to do data transfer. The IO selection register 70 is connected to the first internal module 61a by a first IO select signal line 71a and is connected to the second internal module 61b by a second IO select signal line 71b. The IO selection register 70 sends the first select signal SELa to the first internal module 61a over the first IO select signal line 71a, which selects the first internal module 61a as the target for data transfer. Likewise, the IO selection register 70 sends the second select signal SELb to the second internal module 61b over the second IO select signal line 28b 71b, which selects the second internal module 61b as the target for data transfer.

The transfer instruction register 72 holds a value for determining whether or not to given a transfer instruction to the transfer control section 62. The transfer instruction register 72 is connected to the transfer control section 62 by a transfer instruction line 73 and sends the transfer instruction signal to the transfer control section 62 over the transfer instruction line 73.

The operation of the data transfer control apparatus according to the first embodiment of the invention thus configured as above will be discussed below. To begin with, the general operation of the data transfer control apparatus will be discussed.

The following will discuss the case where data stored in the RAM 11 is transferred to the first internal module 61a as one example of the operation of the data transfer control apparatus. The operation of the data transfer control apparatus involves a read operation of reading data from the RAM 11 and a write operation of writing data in the first internal module 61a. The read operation is executed under the control of the bus master 51 while the write operation is executed under the control of the transfer control section 62.

Prior to the initiation of the read operation and the write operation, first, a control section (not shown) sets a value which indicates that transfer should be executed in the transfer instruction register 72. This makes the transfer instruction signal active to inform the transfer control section 62 that data transfer over the transfer instruction line 73 should be performed. The control section (not shown) also sets a value which indicates that the first internal module 61a should be selected in the IO selection register 70. This makes the first select signal SELa active to inform the first internal module 61a that the first internal module 61a has been selected as the target for data transfer over the first IO select signal line 71a. When this preparation is completed, the transfer operation is initiated.

First, the read operation of reading data from the RAM 11 will be discussed. The read operation is carried out by the bus master 51. That is, the bus master 51 outputs the master control signal MCS needed to read data to the master control signal bus 3. Simultaneously, the bus master 51 outputs the master address signal MADDR indicative of the read start position in the RAM 11 to the master address bus 2. When the master control signal MCS is output to the master control signal bus 3, the BIU_R 10 checks if the master address signal MADDR output from the master address bus 2 specifies the RAM 11. When it is turned out that the master address signal MADDR specifies the RAM 11, and in turn the BIU_R 10 performs a data read protocol on the RAM slave bus 10a.

Namely, the BIU_R 10 outputs the RAM control signal RCS needed to read data from the RAM 11 to the RAM control signal bus 15. Simultaneously, the BIU_R 10 outputs the master address signal MADDR indicative of the read start position in the RAM 11 to the master address bus 2 as the RAM address signal RADDR. As a result, data is read from the RAM 11 and output to the RAM read data bus 13 as the RAM read data RDR.

At this time, unlike what is described in the above-described ordinary data transfer control apparatus, the BIU_R 10 does not output the RAM read data RDR sent via the RAM read data bus 13 to the RAM read data bus 5 in the master bus 51a. Instead, the BIU_R 10 sends the RAM read data RDR as transfer write data TDW to the first internal module 61a via the IO write data bus 64. The read operation of reading data from the RAM 11 is completed.

The write operation to write data read from the RAM 11 into the first internal module 61a will be discussed below. The transfer control section 62 monitors the RAM control signal RCS carried over the RAM control signal bus 15. Therefore, the transfer control section 62 recognizes the timing of outputting the RAM read data RDR to the RAM read data bus 13 from the RAM 11. At that time, the transfer control section 62 makes the IO write strobe signal WS active, which is contained in the transfer control signal TCS. As a result, the RAM read data RDR sent from the RAM 11 via the RAM read data bus 13 and the IO write data bus 64, i.e., the transfer write data TDW, is written in the first internal module 61a. Thus, the write operation or writing the data read from the RAM 11 into the first internal module 61a is completed. The completion of the read operation and the write operation leads to completion of the operation of transferring a single piece of data stored in the RAM 11 to the first internal module 61a.

The following will discuss the case where data stored in the RAM 11 is transferred to the bus master 51 as another example of the operation of the data transfer control apparatus. In this case, the operation of the data transfer control apparatus only involves a read operation of reading data from the RAM 11. Prior to the initiation of the read operation, first, the control section (not shown) sets a value which indicates that transfer is not executed in the transfer instruction register 72. This makes the transfer instruction signal inactive to inform the transfer control section 62 that data transfer over the transfer instruction line 73 does not take place. The subsequent operation is the same as that of the read operation of the ordinary data transfer control apparatus which has been already discussed.

Figure 4:
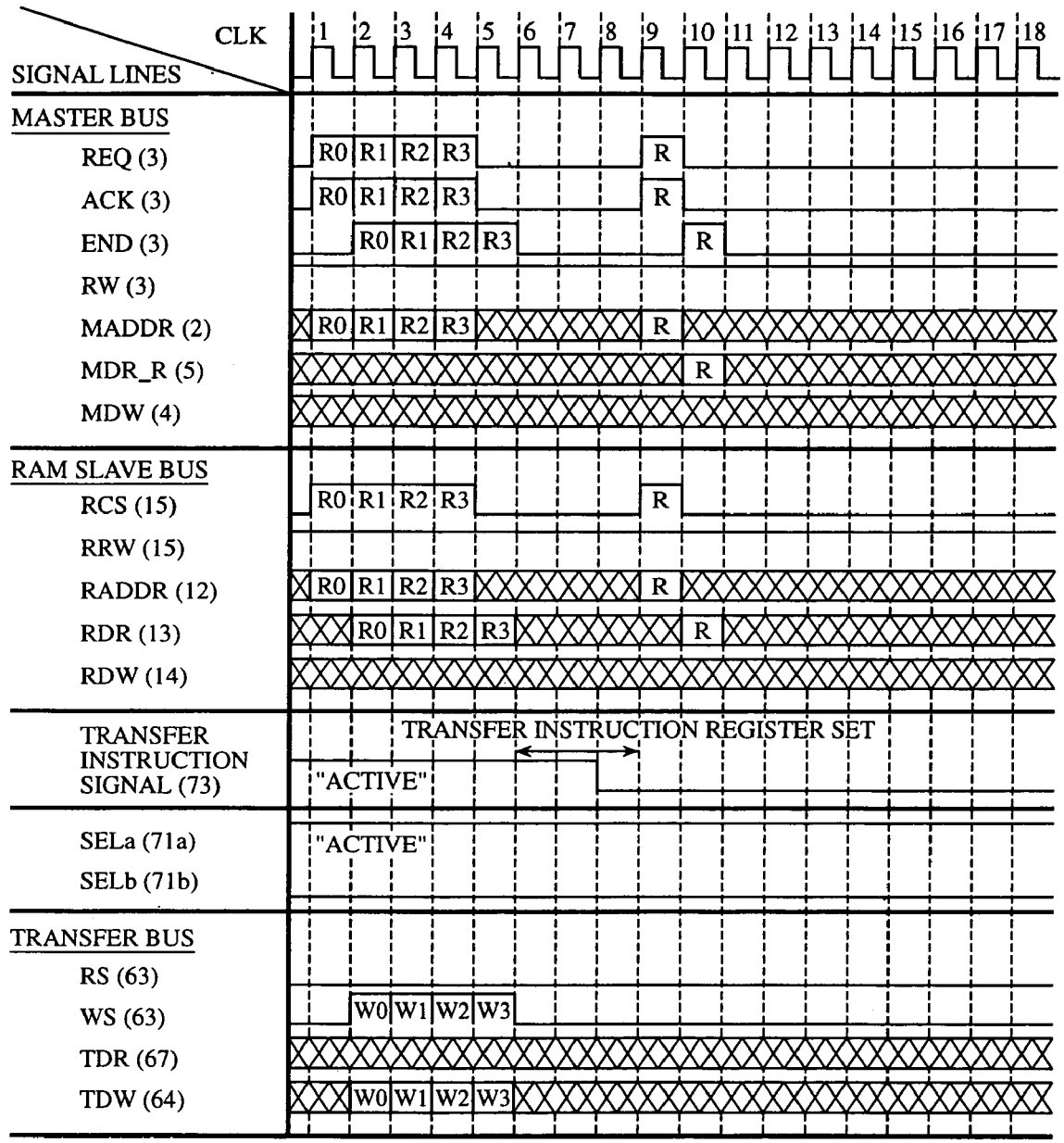
FIG. 4 is a timing chart for explaining the operation of the data transfer control apparatus shown in FIG. 3.

The operation of the data transfer control apparatus according to the first embodiment will be further discussed in detail referring to a timing chart shown in FIG. 4. In FIG. 4, "R" represents that it is associated with a single read operation to be executed at the time of reading data from the RAM 11. This holds true for FIGS. 7 and 9 which will be discussed later.

FIG. 4 shows timings in case of transferring four pieces of data from the RAM 11 to the first internal module 61a. Before data transfer, as mentioned above, a predetermined value is set in the transfer instruction register 72 and the IO selection register 70, thereby making the transfer instruction signal and the first select signal SELa active.

Next, within the CLK "1", the bus master 51 asserts the access request signal REQ, the master read/write signal RW and the master address signal MADDR. The master read/write signal RW represents "read" at an H level and "write" at an L level. When the BIU_R 10 determines that an address for the RAM 11 is output and the RAM 11 is an acknowledgeable state by checking the master address signal MADDR output to the master address bus 2, the BIU_R 10 asserts the access acknowledge signal ACK within the CLK "1". Within the CLK "1", the BIU_R 10 also asserts the RAM control signal RCS, the RAM address signal RADDR and the RAM read/write signal RRW to send a read request to the RAM 11. The RAM read/write signal RRW represents "read" at an H level and "write" at an L level.

The RAM read data RDR read from the RAM 11 in response to the read request is output to the RAM read data bus 13 within a CLK "2" of the read request. The RAM read data RDR output to the RAM read data bus 13 is supplied as transfer write data TDW to the first internal module 61*a* via the IO write data bus 64. Simultaneously, the BIU_R 10 asserts the access end signal END.

The transfer control section 62 asserts the IO write strobe signal WS within the CLK "2". Accordingly, the transfer write data TDW output to the IO write data bus 64 is written in the first internal module 61*a*, selected by the first select signal SELa, within the CLK "2". Thus, the operation of transferring a single piece of data stored in the RAM 11 to the first internal module 61*a* is completed. Thereafter, second to fourth data are likewise transferred.

Data transfer from the first internal module 61*a* to the RAM 11 involves an operation for the bus master 51 to read data from the first internal module 61*a* and data read from the first internal module 61*a* is directly written in the RAM 11 without being sent to the bus master 51. As those operations are similar to those of transferring data from the RAM 11 to the first internal module 21*a*, their descriptions are omitted.

Unlike the ordinary data transfer control apparatus described earlier, the data transfer control apparatus according to the first embodiment eliminates the need that the bus master 51 should fetch data, read from the RAM 11, via the master bus 51*a* and then write the data in the first internal module 61*a* or the second internal module 61*b* via the master bus 51*a*. However, data read from the RAM 11 is directly written into the first internal module 61*a* or the second internal module 61*b* without intervention of the master bus 51*a*. As shown in FIG. 4, therefore, it is possible to continuously output the access request signal REQ within the CLK "1" to CLK "4", thus ensuring a serial read operation.

In the operational example shown in FIG. 4, the setting of the transfer instruction register 72 is done within a CLK "6" to a CLK "8", and the transfer instruction signal becomes inactive within the CLK "8" after which the bus master 51 reads data from the RAM 11 within a CLK "9" and a CLK "10".

The data transfer control apparatus according to the first embodiment, as discussed above, requires five clock cycles to transfer four pieces of data from the RAM 11 to the first internal module 61*a*, whereas the ordinary data transfer control apparatus requires twelve clock cycles to transfer four pieces of data from the RAM 11 to the first internal module 21*a*.

In short, the bus master is exempted from an alternate data read operation and a data write operation at the time of transferring data and may do nothing but perform a read operation or a write operation continuously, thus reducing the number of clock cycles for data transfer. The reduction in the number of clock cycles lowers the consumed power of the system LSI to which the data transfer control apparatus is adapted.

Second Embodiment

A data transfer control apparatus according to the second embodiment of the invention will then be discussed. The second embodiment is, unlike the first embodiment, directed to the data transfer control apparatus modified in such a way that the transfer instruction signal given to the transfer control section 62 is generated based on the RAM address signal RADDR supplied to the RAM 11.

Figure 5:
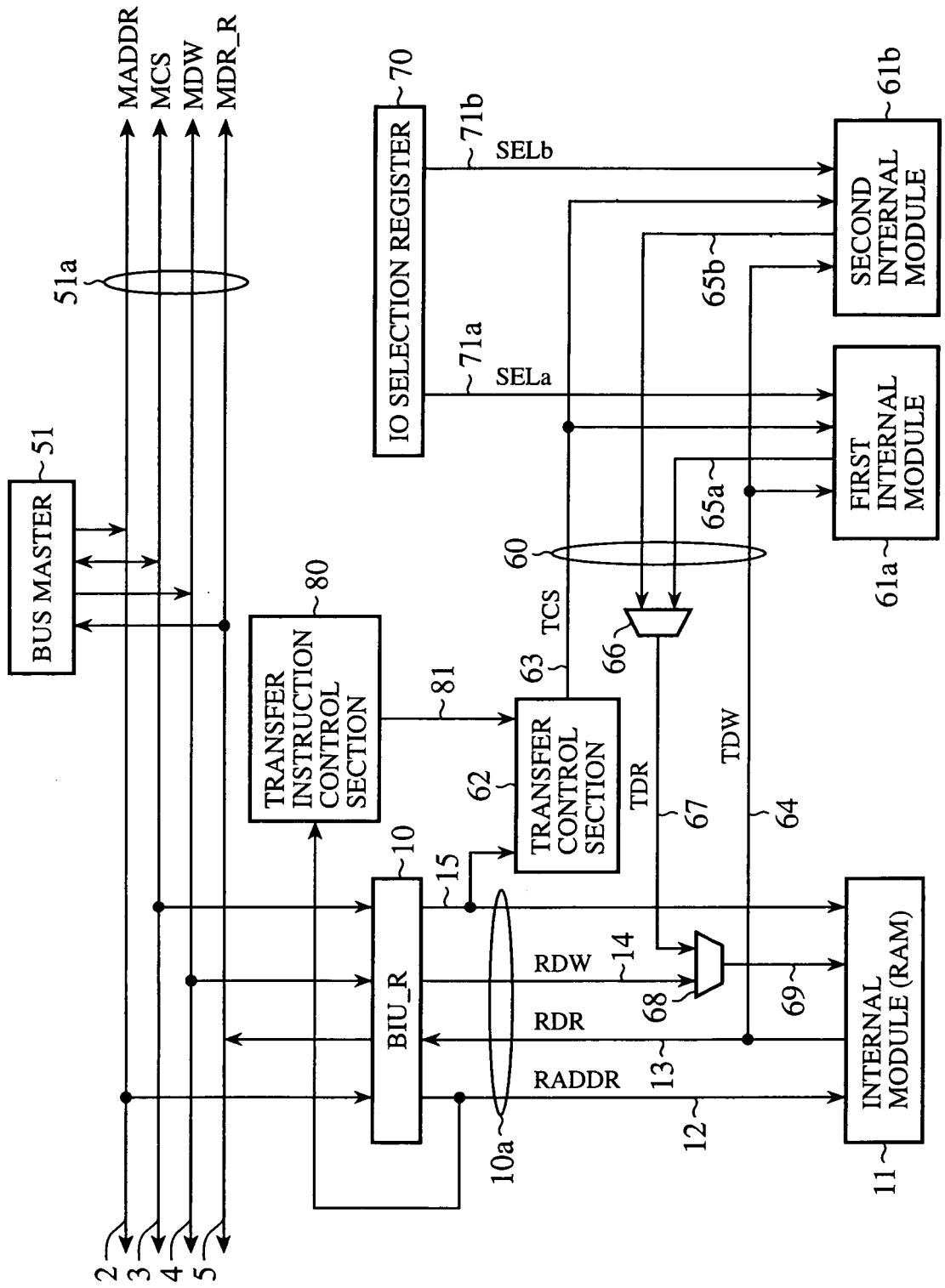
FIG. 5 is a block diagram showing the configuration of a data transfer control apparatus according to a second embodiment of the invention.

FIG. 5 is a block diagram showing the configuration of the data transfer control apparatus according to the second embodiment of the invention. This data transfer control apparatus is constructed by replacing the transfer instruction register 72, one structural element of the data transfer control apparatus according to the first embodiment shown in FIG. 3, with a transfer instruction control section 80.

The transfer instruction control section 80 generates a transfer instruction signal to determine whether or not to give a transfer instruction to the transfer control section 62 based on the RAM address signal RADDR output to the RAM address bus 12. The transfer instruction control section 80 is connected to the transfer control section 62 by a transfer instruction line 81 and sends the transfer instruction signal to the transfer control section 62 over the transfer instruction line 81.

Figure 6:
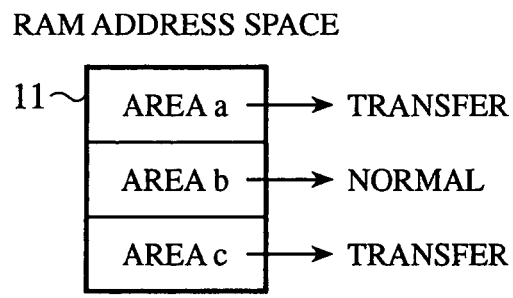
FIG. 6 is a diagram for explaining the address area of a RAM to be used in the data transfer control apparatus shown in FIG. 5.

Suppose that the address space of the RAM 11 is separated into three areas, an area a, area b and area c, and the areas a and c are defined as data transfer areas while the area b is defined as a normal memory area, as shown in FIG. 6. The transfer instruction control section 80 sets the transfer instruction signal active when the area a or the area b is specified by the RAM address signal RADDR, and sets the transfer instruction signal inactive when the area c is specified by the RAM address signal RADDR. An area in the RAM 11 is defined by setting a predetermined value in a register (not shown). Changing the contents of the register alters arbitrarily the definition of an area in the RAM 11.

The operation of the data transfer control apparatus according to the second embodiment of the invention thus configured as above will be described below.

This data transfer control apparatus carries out data transfer between the bus slaves (between the RAM 11 and the first internal module 61*a* or the second internal module 61*b*) when the transfer control signal output from the transfer instruction control section 80 is active, and does data transfer between the bus master 51 and a bus slave (the RAM 11, the first internal module 61*a* or the second internal module 61*b*) when the transfer control signal is inactive in the same manner as with the first embodiment.

Figure 7:
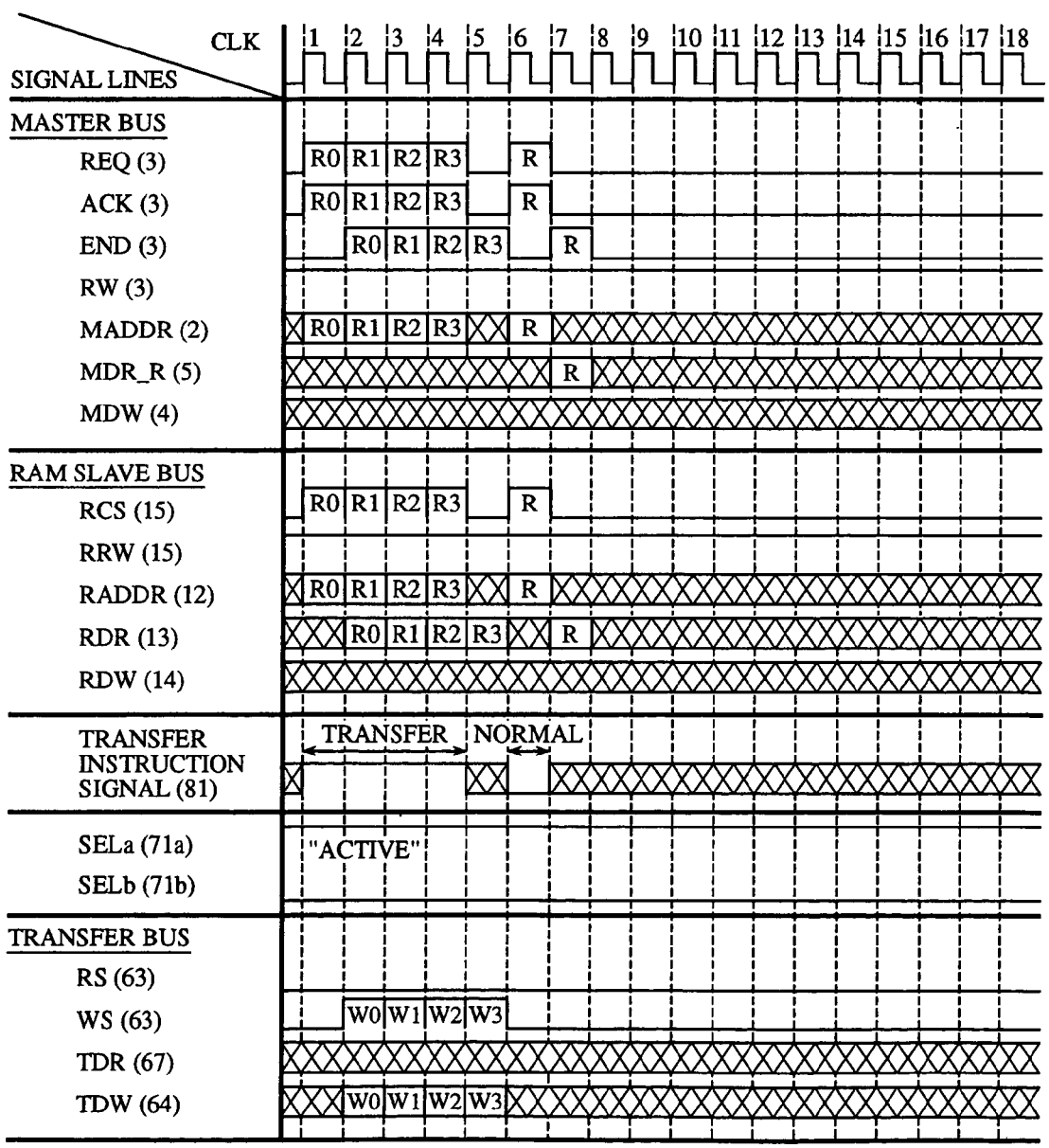
FIG. 7 is a timing chart for explaining the operation of the data transfer control apparatus shown in FIG. 5.

The operation of the data transfer control apparatus according to the second embodiment will be further discussed in detail referring to a timing chart shown in FIG. 7.

The feature of the data transfer control apparatus according to the second embodiment is in that the operation at the time the mode of data transfer is changed. A description will be given of, as one example of the operation, a case where the operation is switched to the mode of transferring data from the RAM 11 to the bus master 51 after four pieces of data have been transferred from the RAM 11 to the first internal module 61*a*.

Within the CLK "1" to CLK "4", when the RAM address signal RADDR on the RAM address bus 12 specifies the area a or area c, the transfer instruction control section 80 determines that data should be transferred between bus slaves and renders the transfer instruction signal active. As a result, data read from the RAM 11 is transferred to the first internal module 61a.

Within the CLK "6", when the RAM address signal RADDR on the RAM address bus 12 specifies the area b, the transfer instruction control section 80 determines that data should be transferred between a bus slave and the bus master 51 and renders the transfer instruction signal inactive. As a result, data read from the RAM 11 is transferred to the bus master 51.

As described above, the data transfer control apparatus according to the second embodiment switches either data transfer between bus slaves and ordinary data transfer or between a bus slave and the bus master in accordance with the area in the RAM 11 to be accessed. This eliminates the setting of a value in the transfer instruction register which requires three clock cycles in the data transfer control apparatus according to the first embodiment (see FIG. 4). This reduces the overhead for the instruction of data transfer, thus ensuring efficient and fast data transfer in fewer clock cycles.

Third Embodiment

A data transfer control apparatus according to the third embodiment of the invention will then be discussed. The third embodiment is, unlike the first embodiment, directed to the data transfer control apparatus modified in such a way that the transfer instruction signal generated by the transfer control section 62 is generated by the bus master.

Figure 8:
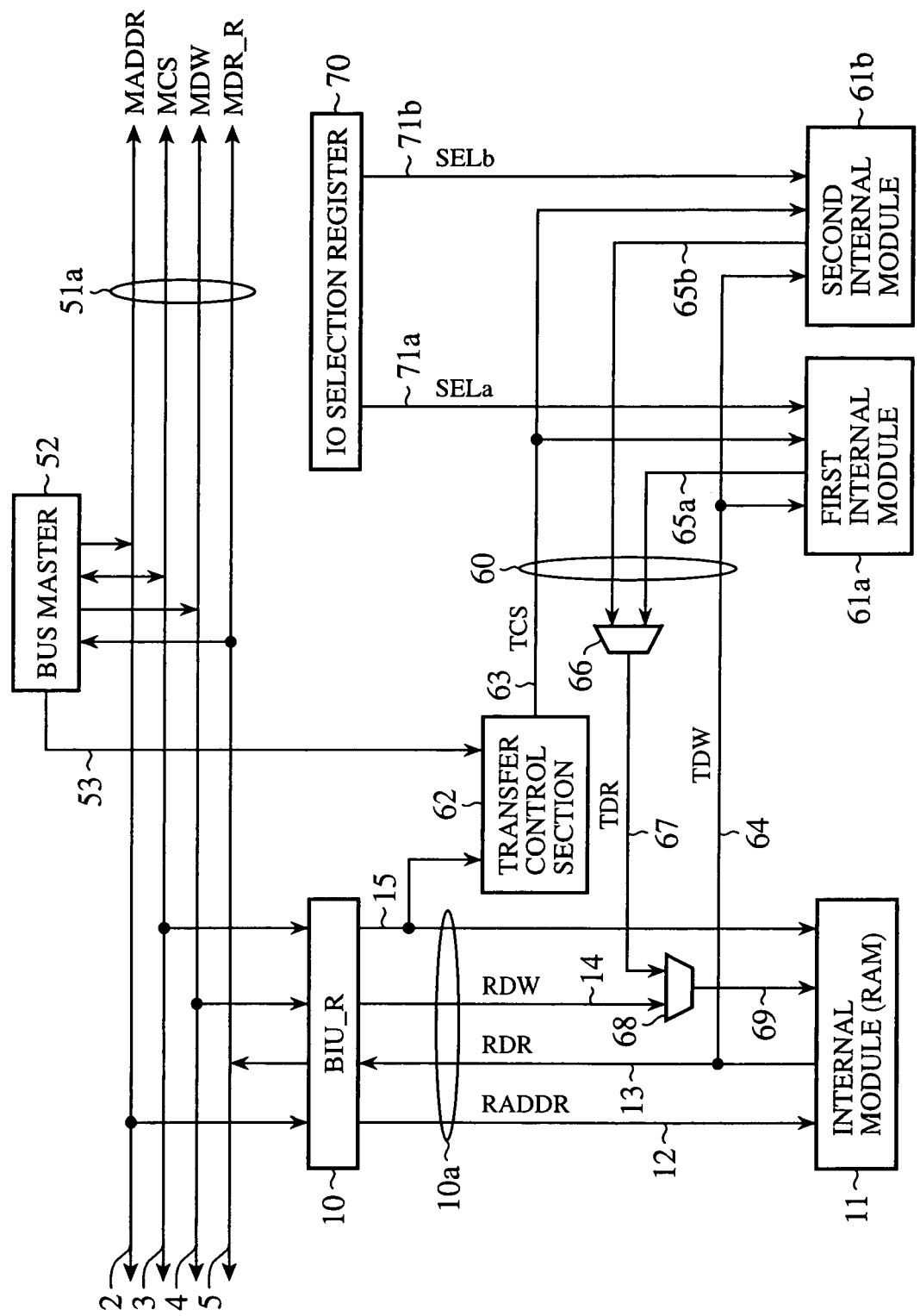
FIG. 8 is a block diagram showing the configuration of a data transfer control apparatus according to a third embodiment of the invention.

FIG. 8 is a block diagram showing the configuration of the data transfer control apparatus according to the third embodiment of the invention. This data transfer control apparatus is constructed by removing the transfer instruction register 72, one structural element of the data transfer control apparatus according to the first embodiment shown in FIG. 3, and by replacing instead the bus master 51 with a new bus master 52.

The bus master 52 accesses the RAM 11, the first internal module 61a and the second internal module 61b via the BIU_R 10 and exchanges data with those components and executes data transfer between the RAM 11 and the first internal module 61a or the second internal module 61b. The bus master 52 generates a transfer instruction signal and sends it to the transfer control section 62 over a transfer instruction line 53.

The operation of the data transfer control apparatus thus configured as above according to the third embodiment of the invention will be described below.

This data transfer control apparatus executes data transfer between a plurality of bus slaves (between the RAM 11 and the first internal module 61a or the second internal module 61b) when the transfer control signal output from the bus master 52 is active, and does data transfer between the bus master 52 and a bus slave (the RAM 11, the first internal module 61a or the second internal module 61b) when the transfer control signal is inactive, in the same way as the first embodiment.

Suppose that the bus master 52 is a DMA transfer controller (hereinafter abbreviated as "DMAC") and the DMAC has two transfer channels, channel 0 and channel 1. It is also assumed that the channel 0 is allocated in such a way as to carry out data transfer from the RAM 11 to the first internal module 61a and the channel 1 is allocated in such a way as to carry out data transfer from the RAM 11 to another module (not shown) connected to the master bus 51a.

In case where the DMAC performs data transfer using the channel 0, the bus master 52 renders the transfer instruction signal to be output to the transfer instruction line 53 active in response to an instruction from the control section (not shown). In case where the DMAC continuously performs data transfer using the channel 1, the bus master 52 renders the transfer instruction signal to be output to the transfer instruction line 53 inactive in response to an instruction from the control section (not shown).

Figure 9:
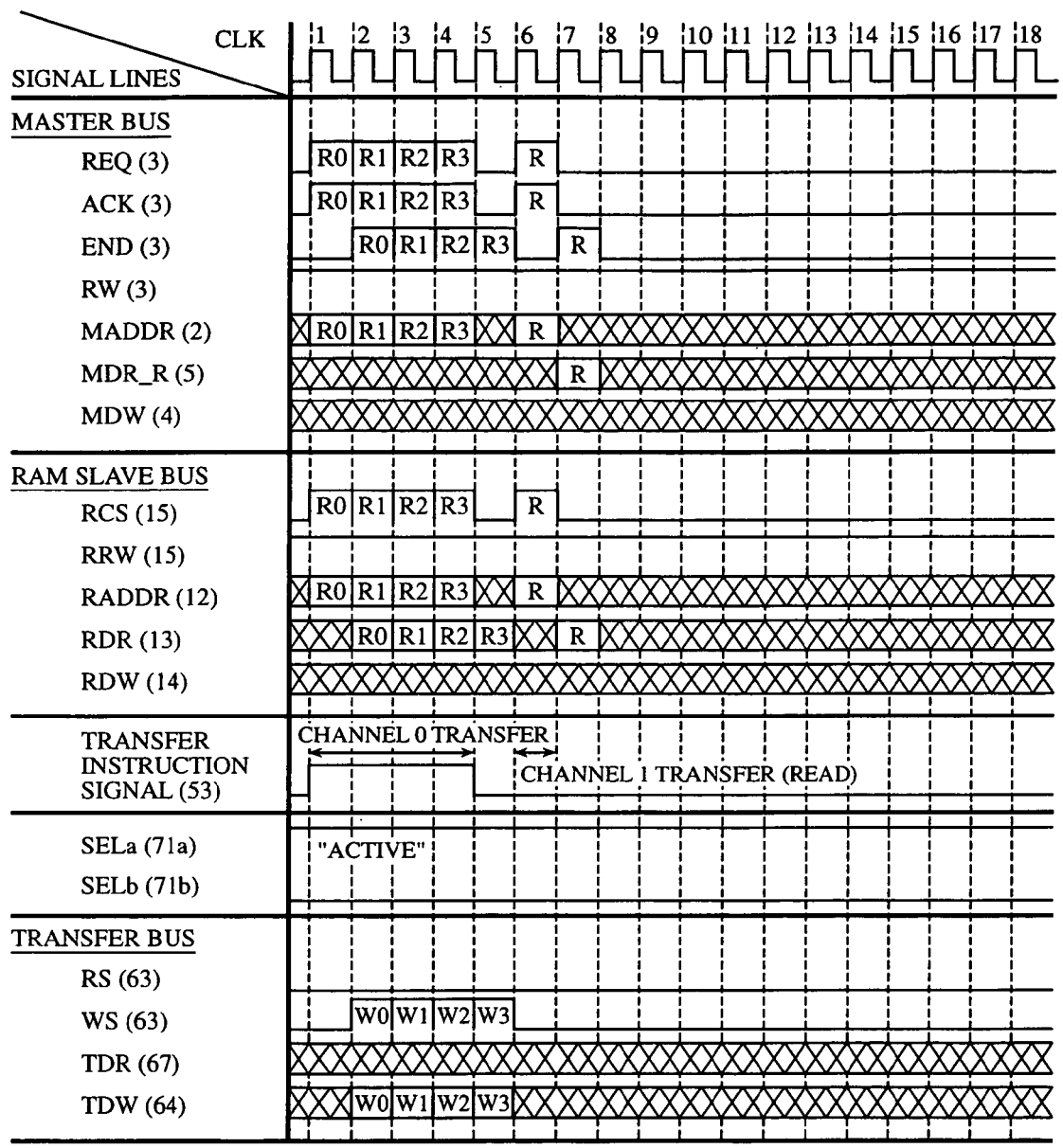
FIG. 9 is a timing chart for explaining the operation of the data transfer control apparatus shown in FIG. 8.

The operation of the data transfer control apparatus in this case will be discussed referring to a timing chart shown in FIG. 9. Within the CLK "1" to CLK "5", the DMAC executes data transfer using the channel 0. That is, the DMAC transfers data to the first internal module 61a from the RAM 11 via the transfer bus 60 to make the transfer control signal active. Within the CLK "6", the DMAC executes data transfer using the channel 1. That is, the DMAC fetches data, read from the RAM 11, via the RAM slave bus 10a, the BIU_R 10 and the master bus 51a. Then, the data fetched by the DMAC is sent to a module (not shown) via the master bus 51a.

A description will now be given of a case where the channel 0 of the DMAC is allocated in such a way as to execute data transfer from the RAM 11 to the first internal module 61a and the channel 1 is allocated in such a way as to execute data transfer from the RAM 11 to the second internal module 61b.

In case where the DMAC performs data transfer using the channel 0, the bus master 52 renders the transfer instruction signal to be output to the transfer instruction line 53 active in response to an instruction from the control section (not shown). In case where the DMAC continuously performs data transfer using the channel 1, the bus master 52 renders the transfer instruction signal to be output to the transfer instruction line 53 active in response to an instruction from the control section (not shown), after the second internal module 61b is selected by the IO selection register 70.

Figure 10:
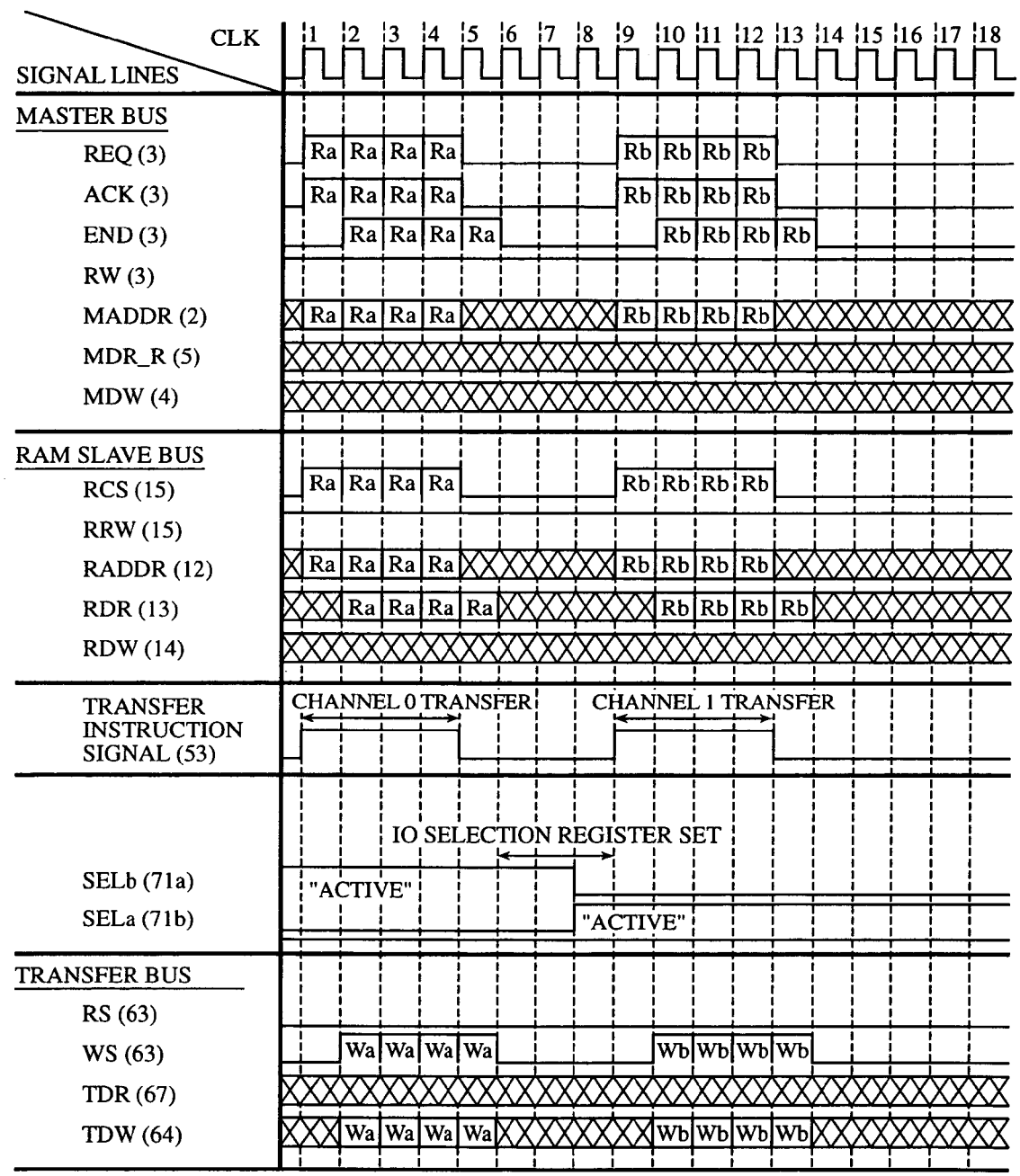
FIG. 10 is a timing chart for explaining another operation of the data transfer control apparatus shown in FIG. 8.

The operation of the data transfer control apparatus in this case will be discussed referring to a timing chart shown in FIG. 10. In FIG. 10, Ra and Wa represent signals associated with data transfer over the channel 0 and Rb and Wb represent signals associated with data transfer over the channel 1. Those signals Ra, Wa, Rb and Wb are commonly used in other timing charts that will be mentioned later.

Within the CLK "1" to CLK "5", the DMAC executes data transfer using the channel 0. That is, the DMAC transfers data to the first internal module 61a from the RAM 11 via the transfer bus 60 to make the transfer control signal active. Within the CLK "6" to CLK "8", the setting of the IO selection register 70 is carried out. Within the CLK "8", the first select signal SELa output from the IO selection register 70 becomes inactive and the second select signal SELb becomes active. This allows the second internal module 61b to be selected. Within the subsequent CLK "9" to CLK "13", the DMAC executes data transfer using the channel 1. That is, the DMAC transfers data to the second internal module 61b from the RAM 11 via the transfer bus 60 in order to render transfer control signal active.

As described above, the data transfer control apparatus according to the third embodiment allows the bus master 52 to generate the transfer instruction signal, thus eliminating the transfer instruction register 72 in the data transfer control apparatus according to the first embodiment, thereby simplifying the configuration of the data transfer control apparatus. Moreover, this sets the operational frequency high as it dispenses with address comparison.

Fourth Embodiment

A data transfer control apparatus according to the fourth embodiment of the invention will then be discussed. The fourth embodiment is, unlike the third embodiment, directed to the data transfer control apparatus modified in such a way that the first select signal SELa and the second select signal SELb generated by the IO selection register 70 are generated by the bus master.

Figure 11:
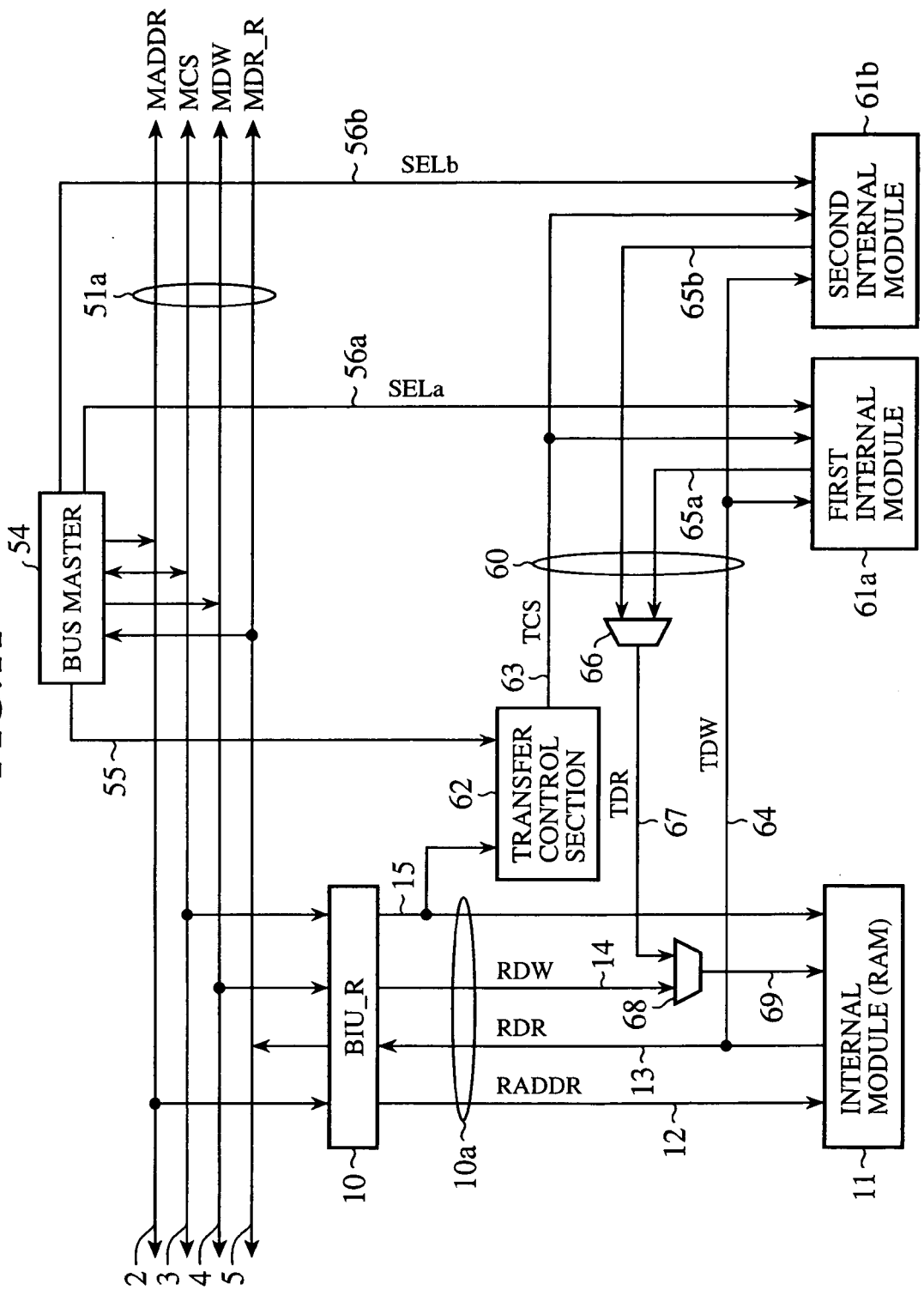
FIG. 11 is a block diagram showing the configuration of a data transfer control apparatus according to a fourth embodiment of the invention.

FIG. 11 is a block diagram showing the configuration of the data transfer control apparatus according to the fourth embodiment of the invention. This data transfer control apparatus is constructed by removing the IO selection register 70, one structural element of the data transfer control apparatus according to the third embodiment shown in FIG. 8, and by replacing instead the bus master 52 with a new bus master 54.

The bus master 54 accesses the RAM 11, the first internal module 61a and the second internal module 61b via the BIU_R 10 and exchanges data with those components and executes data transfer between the RAM 11 and the first internal module 61a or the second internal module 61b. The bus master 54 generates a transfer instruction signal and sends it to the transfer control section 62 over a transfer instruction line 55. Further, the bus master 54 generates the first select signal SELa and sends it to the first internal module 61a over a first select signal line 56a and generates the second select signal SELb and sends it to the second internal module 61b over a second select signal line 56b.

The operation of the data transfer control apparatus thus configured as above according to the fourth embodiment of the invention will be described below.

When the transfer control signal output from the bus master 54 is active, this data transfer control apparatus executes data transfer between a plurality of bus slaves (between the RAM 11 and the first internal module 61a or the second internal module 61b) in the same way as the first embodiment, except for the method of selecting between the first internal module 61a and the second internal module 61b. When the transfer control signal is inactive, the data transfer control apparatus executes data transfer between the bus master 54 and a bus slave (the RAM 11, the first internal module 61a or the second internal module 61b) in the same way as the first embodiment.

Suppose that the bus master 54 is a DMAC and the DMAC has two transfer channels, channel 0 and channel 1. It is also assumed that the channel 0 is allocated in such a way as to execute data transfer from the RAM 11 to the first internal module 61a and the channel 1 is allocated in such a way as to execute data transfer from the RAM 11 to the second internal module 61b.

In case where the DMAC performs data transfer using the channel 0, the bus master 54 renders the transfer instruction signal to be output to the transfer instruction line 53 active and renders the first select signal SELa to be output to the first select signal line 56a active. In case where the DMAC continuously performs data transfer using the channel 1, the bus master 54 renders the transfer instruction signal to be output to the transfer instruction line 53 active and renders the second select signal SELb to be output to the second select signal line 56b active.

The operation of the data transfer control apparatus in this case will be discussed referring to a timing chart shown in FIG. 12.

Within the CLK "11" to CLK "5", the DMAC executes data transfer using the channel 0. That is, within the CLK "1", the DMAC sends the RAM read data RDR, read from the RAM 11 within the CLK "1" to CLK "4", to the RAM read data bus 13 in order to make the transfer control signal and the first select signal SELa active. The RAM read data RDR output to the RAM read data bus 13 is sent to the first internal module 61a as the transfer write data TDW and written there via the IO write data bus 64 within the CLK "2" to CLK "5". The DMAC keeps the first select signal SELa active during the time period from the initiation of data transfer to the end thereof, i.e., from the CLK "1" to the CLK "15".

Within the CLK "6" to CLK "10", the DMAC executes data transfer using the channel 1. That is, within the CLK "6", the DMAC sends the RAM read data RDR, read from the RAM 11 within the CLK "6" to CLX "9", to the RAM read data bus 13 in order to make the transfer control signal and the second select signal SELB active. The RAM read data RDR output to the RAM read data bus 13 is sent to the second internal module 61b as the transfer write data TDW and written there via the IO write data bus 64 within the CLK "7" to CLK "10". The DMAC keeps the second select signal SELB active during the time period from the initiation of data transfer to the end thereof, i.e., from the CLK "6" to the CLK "9".

In the data transfer control apparatus according to the fourth embodiment, as described above, the bus master 54 outputs a signal to select a bus slave which is the destination of data transfer, it is unnecessary to set a predetermined value in the IO selection register 70 every time data transfer is switched. This eliminates the setting of a value in the IO selection register 70 which requires three clock cycles in the data transfer control apparatus according to the third embodiment (see FIG. 10). This reduces the overhead for the instruction of data transfer, thus making it possible to eliminate the overhead for selection of a bus slave.

It is to be noted that the data transfer control apparatuses according to the data transfer control apparatuses according to the first to third embodiments can be constructed so that the bus master generates the first select signal SELa and the second select signal SELb as with the third embodiment.

Fifth Embodiment

A data transfer control apparatus according to the fifth embodiment of the invention will then be discussed. The fifth embodiment is, unlike the fourth embodiment, directed to the data transfer control apparatus modified in such a way that the transfer instruction signal is generated in response to information for controlling an external device.

FIG. 13 is a block diagram showing the configuration of the data transfer control apparatus according to the fifth embodiment of the invention. This data transfer control apparatus is constructed by replacing the BIU_R 10, the transfer control section 62 and the RAM 11, structural elements of the data transfer control apparatus according to the fourth embodiment shown in FIG. 11, with an external bus interface unit (hereinafter referred to as "BIU_E") 90, a transfer control section 110 and an external device control section 91, respectively. An external device 101 is connected to the external device control section 91.

To access the external device 101 via the external device control section 91, the BIU_E 90 mutually converts the protocol of the master bus 51a and that of an external device slave bus 90a. The BIU_E 90 is connected to the external device control section 91 via the external device slave bus 90a.

The external device slave bus 90*a* comprises an external address bus 92, an external lead data bus 93, an external write slave bus 94 and an external control signal bus 95.

The external address bus 92 is used to send an external address signal EADDR from the BIU_E 90 to the external device control section 91. The external lead data bus 93 is used to send external read data EDR, read from the external device control section 91, to the BIU_E 90. The external write slave bus 94 is used to send external write data EDW, output from the BIU_E 90, to the external device control section 91 via a selector 96. The external control signal bus 95 is used to send an external control signal ECS, output from the BIU_E 90, to the external device control section 91 and the transfer control section 110.

The external control signal ECS contains an external device access request signal EREQ for requesting an access to the external device 101, an external device read/write signal ERW for instructing whether to make a read access or a write access to the external device 101 and external device access end signal EEND indicative of the end of an access to the external device 101.

The selector 96 selects either the external write data EDW sent over the external write slave bus 94 from the BIU_E 90 or the transfer read data TDR sent over the IO read data bus 67 from the selector 66 and sends the selected data to the external device control section 91 via a write data bus 97.

The external device control section 91 is an internal module which serves as a bus slave. The external device control section 91 is connected to the transfer control section 110 by an external device access information signal line 98. The external device control section 91 sends information on an access to the external device 101 to the transfer control section 110 as an external device access information signal over the external device access information signal line 98. The external device control section 91 is further connected via an external bus 91*a* to the external device 101 externally connected to the system LSI.

The external bus 91*a* comprises an external device address bus 102, an external device data bus 103 and an external device control signal bus 104.

The external device address bus 102 is used to send an external device address signal to the external device 101. The external device data bus 103 is used for data exchange between the external device control section 91 and the external device 101. The external device control signal bus 104 is used to send an external device control signal, output from the external device control section 91, to the external device 101. The external device control signal contains a command for the external device 101.

The transfer control section 110 generates a transfer control signal TCS for controlling data transfer between the external device control section 91 and the first internal module 61*a* or the second internal module 61*b* based on the external control signal ECS from the external control signal bus 95, the transfer instruction signal from the bus master 54 and the external device access information signal from the external device control section 91. The generated transfer control signal TCS is sent to the first internal module 61*a* and the second internal module 61*b* by the transfer control signal bus 63. The transfer control signal TCS contains an IO read strobe signal RS and an IO write strobe signal WS.

The operation of the data transfer control apparatus thus configured as above according to the fifth embodiment of the invention will be discussed below. First, the general operation of the data transfer control apparatus will be discussed.

The following will discuss the case of transferring data to the external device 101 from the first internal module 61*a* as one example of the operation of the data transfer control apparatus. The operation of the data transfer control apparatus involves a read operation of reading data from the first internal module 61*a* and a write operation of writing read data in the external device 101 via the external device control section 91. The read operation is executed under the control of the transfer control section 62 while the write operation is executed under the control of the bus master 54.

Prior to the initiation of the data transfer operation, the bus master 54 renders the transfer instruction signal active to inform, via the transfer instruction line 55, the transfer control section 110 of data transfer that should take place. Further, the bus master 54 a control section (not shown) sets a value which indicates that transfer should be executed in the transfer instruction register 72. This makes the transfer instruction signal active to inform the transfer control section 62 that data transfer via the transfer instruction line 73 should be performed. The control section (not shown) also sets a value which indicates that the first internal module 61*a* should be selected in the IO selection register 70. This makes the the first select signal SELa indicating that the first internal module 61*a* is to be selected actve, and informs the first internal module 61*a*, via the first select signal line 56*a*, that the module 61*a* has been selected as the target for data transfer. When this preparation is completed, the transfer operation is initiated.

The data transfer operation starts with a write operation to the external device 101 by the bus master 54. That is, the bus master 54 outputs the master control signal MCS needed to write data to the master control signal bus 3. Simultaneously, the bus master 54 outputs the master address signal MADDR specifying the external device 101 which is the target for a write access to the master address bus 2. When the master control signal MCS is output to the master control signal bus 3, the BIU_E 90 checks if the master address signal MADDR output from the master address bus 2 specifies the external device 101. When it is reveled that the master address signal MADDR specifies the external device 101, the BIU_E 90 performs a data write protocol on the external device slave bus 90*a*.

Namely, the BIU_E 90 sends the external control signal bus 95 the external control signal ECS needed to write data in the external device 101. Simultaneously, the BIU_E 90 outputs an address necessary for the external device 101 as the external address signal EADDR to the external address bus 92. When receiving those external control signal ECS and external address signal EADDR, the external device control section 91 performs a write operation on the external device 101 via the external bus 91*a*.

That is, the external device control section 91 sends a control signal necessary to write data in the external device 101 to the external device control signal bus 104 which constitutes the external bus 91*a*. The external device control section 91 also sends an address necessary to write data in the external device 101 to the external device address bus 102. Further, the external device control section 91 outputs data to be written in the external device 101 to the external device data bus 103. As a result, data is written in the external device 101. The data that is to be written in the external device 101 should be read from the first internal module 61*a* at the write timing and should be transferred to the external device control section 91 over the IO read data bus 67, the selector 96 and the write data bus 97.

The operation of reading data from the first internal module 61*a* will be discussed below. The transfer control section 110 monitors the external control signal ECS carried over the external control signal bus 95 which constitutes the external device slave bus 90a. The transfer control section 110 identifies the timing to access the external device 101 based on the external device access information signal sent from the external device access information signal line 98. Based on those external control signal ECS and the external device access information signal, the transfer control section 110 determines the write timing at which the external device control section 91 writes data in the external device 101 and outputs the transfer control signal TCS to the transfer control signal bus 63 according to the determined timing.

The first internal module 61a selected by the first select signal SELa reads data in response to the IO read strobe signal RS contained in the transfer control signal TCS and sends the data to the first IO read data bus 65a. The data read onto the first IO read data bus 65a is output to the IO read data bus 67 via the selector 66 and sent to the selector 96 as the transfer read data TDR. The selector 96 passes the transfer read data TDR from the IO read data bus 67 and outputs the data TDR to the write data bus 97 to send it to the external device control section 91. Thus, the operation of transferring data to the external device 101 from the first internal module 61a is completed.

Figure 14:
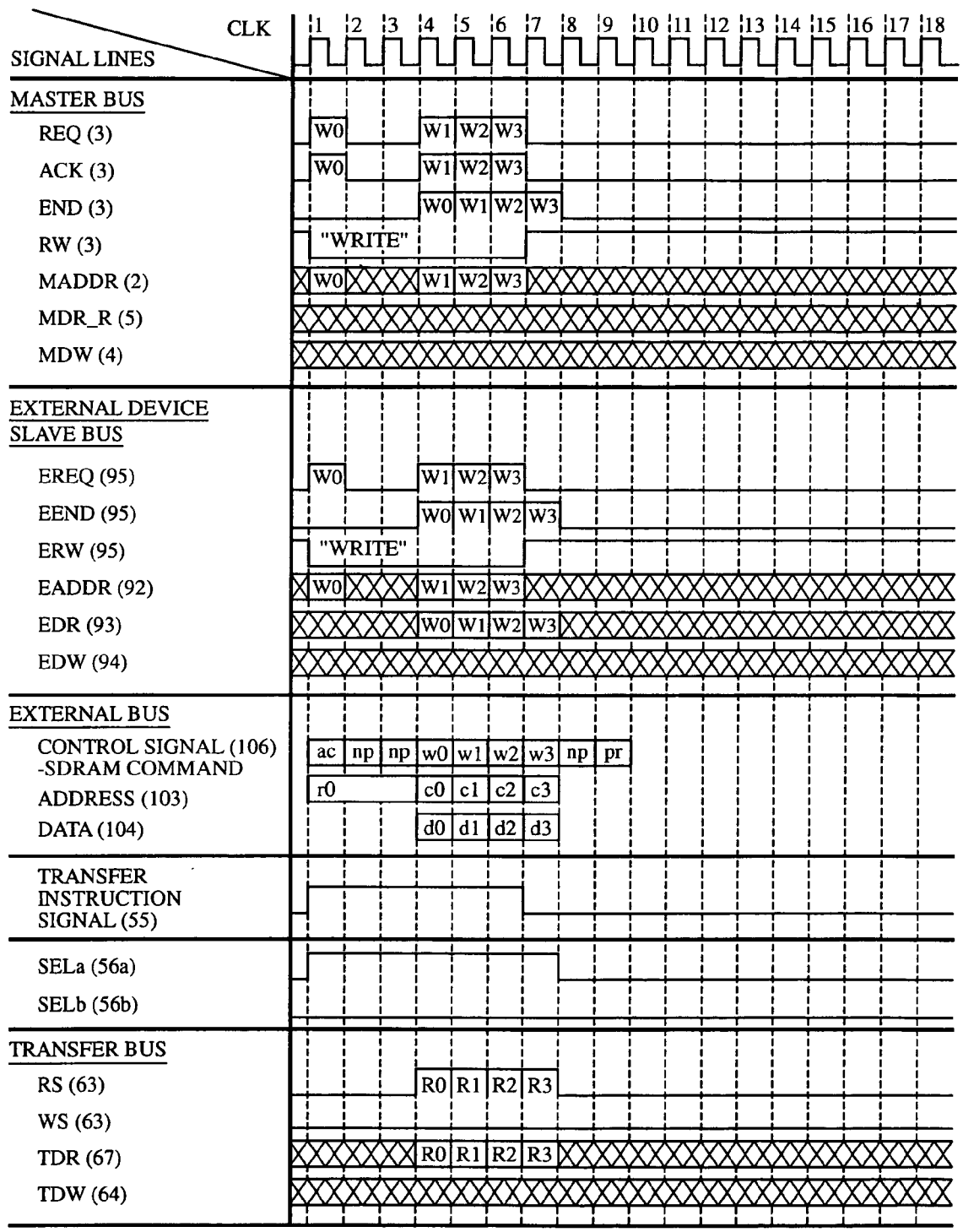
FIG. 14 is a timing chart for explaining the operation of the data transfer control apparatus shown in FIG. 13.

The operation of the data transfer control apparatus according to the fifth embodiment will be further discussed in detail referring to a timing chart shown in FIG. 14. The following will discuss the case where an SDRAM is used as the external device 101.

First, within the CLK "1", the bus master 54 asserts the access request signal REQ, the master read/write signal RW and the master address signal MADDR. The master read/write signal RW represents "read" at an H level and "write" at an L level. When the BIU_E 90 determines that an address for the external device 101 is output by checking the master address signal MADDR output to the master address bus 2, the BIU_E 90 asserts the access acknowledge signal ACK within the CLK "1". Within the CLK "1", the BIU_E 90 performs a read write access to the external device control section 91 by asserting the external device access request signal EREQ, the external address signal EADDR and the external device read/write signal ERW. The external device read/write signal ERW represents "read" at an H level and "write" at an L level.

Within the CLK "1", the external device control section 91 outputs a row active command "ac" to the external device control signal bus 104 and outputs a row address "r0" to the external device address bus 102. Within the subsequent CLK "2" and CLK "3", the external device control section 91 outputs a no-operation command "np" to the external device control signal bus 104. The reason why the no-operation command "np" is output is to meet the requirement that there should be three clock cycles or more between the row active command "ac" and a write command "w0" as the AC timing condition (delay time from a row to a column) of the SDRAM.

Within the next CLK "4", the external device control section 91 sends the write command "w0" to the external device control signal bus 104 and sends a column address "c0" to the external device address bus 102. Simultaneously, the external device control section 91 sends the external device access end signal EEND to the external control signal bus 95. The BIU_E 90 which has received the external device access end signal EEND outputs the access end signal END in the master control signal MCS to the master control signal bus 3 of the master bus 51a. Thus, the first write operation to the external device 101 is completed. Within the subsequent CLK "4" to CLK "7", the second to fourth write operations to the external device 101 are carried out. In case where the second write operation or any subsequent write operation is to be executed, the row active state has already been set so that the write commands "w1" to "w3" are issued continuously.

The read operation on data from the first internal module 61a is carried out within the CLK "4" to CLK "7". Namely, the transfer control section 110 determines that it is necessary to make a delay of three clock cycles in accordance with the AC timing condition (row-to-column delay time) of the SDRAM which is contained in the external device access information signal sent from the external device control section 91, and sends the IO read strobe signal RS to the transfer control signal bus 63 within the CLK "4" to CLK "7". As a result, data is read from the first internal module 61a and is output to the external device data bus 103 via the first IO read data bus 65a, the selector 66, the IO read data bus 67, the selector 96 and the external device control section 91 within the CLK "4" to CLK "7". Thus, the operation of transferring data to the external device 101 from the first internal module 61a is completed.

The number of clock cycles that satisfies the AC timing condition (row-to-column delay time) of the SDRAM depends on the type of the SDRAM and the clock frequency is completed. However, the transfer control section 110 determines the number of clock cycles to be delayed according to the AC timing condition (row-to-column delay time) of the SDRAM which is contained in the external device access information signal sent from the external device control section 91. Even if the type of the SDRAM and the clock frequency are changed, therefore, an accurate and reliable data transfer operation can be executed.

As described above, the data transfer control apparatus according to the fifth embodiment can perform an accurate and reliable data transfer operation on an external device, such as an SDRAM, the number of clock cycles that satisfies the AC timing condition varies depending on the clock frequency or the like.

Although the foregoing description of the fifth embodiment has been given of the case where an SDRAM is used as the external device 101, the embodiment may be adapted not only an SDRAM but also other devices the number of clock cycles needs to be controlled in such a way as to satisfy the AC timing condition. The external device 101 is not necessarily limited to a device which is to be externally connected to the system LSI but also a bus slave which is provided inside the system LSI.

Although the data transfer control apparatus according to the fifth embodiment is constructed by altering some of the structural elements of the data transfer control apparatus according to the fourth embodiment, it may be constructed by altering some of the structural elements of the data transfer control apparatus according to any one of the first to third embodiments without sacrificing the above-described operations and advantages.

Sixth Embodiment

A data transfer control apparatus according to the sixth embodiment of the invention will then be discussed. The sixth embodiment is, unlike the fourth embodiment, directed to the data transfer control apparatus modified in such a way that the first select signal SELa and the second select signal SELb for selecting the first internal module 61a and the second internal module 61b are generated based on the RAM address signal RADDR supplied to the RAM 11.

Figure 15:
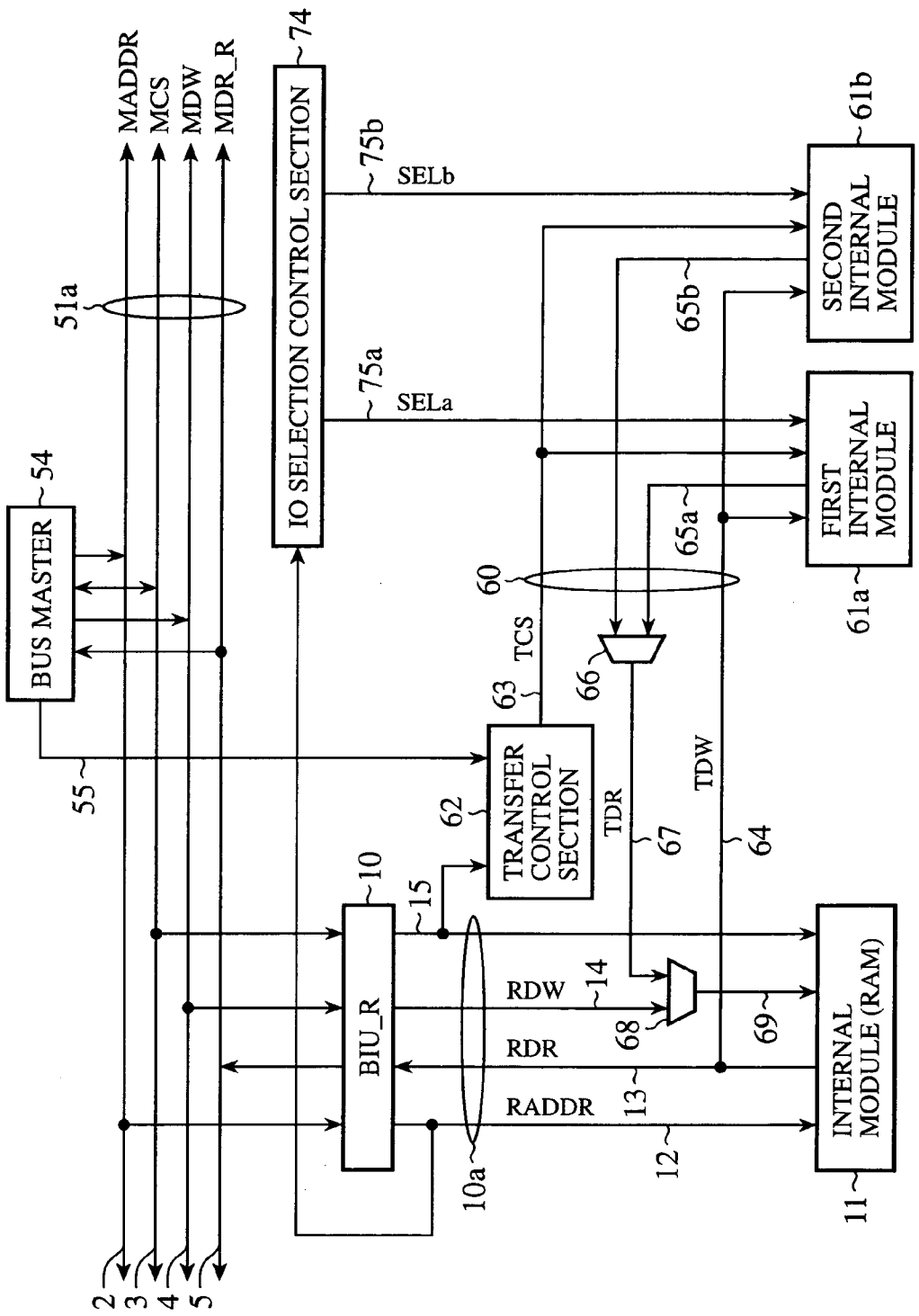
FIG. 15 is a block diagram showing the configuration of a data transfer control apparatus according to a sixth embodiment of the invention.

FIG. 15 is a block diagram showing the configuration of the data transfer control apparatus according to the sixth embodiment of the invention. This data transfer control apparatus is constructed by removing the first select signal line 56a and the second select signal line 56b led out from the bus master 54 of the data transfer control apparatus according to the fourth embodiment shown in FIG. 13 and by adding instead an IO selection control section 74.

The IO selection control section 74 generates the first select signal SELa for selecting the first internal module 61a or the second select signal SELb for selecting the second internal module 61b based on the RAM address signal RADDR from the RAM address bus 12. The first select signal SELa generated by the IO selection control section 74 is sent to the first internal module 61a over a first select signal line 75a. Likewise, the second select signal SELb is sent to the second internal module 61b over a second select signal line 75b.

Figure 16:
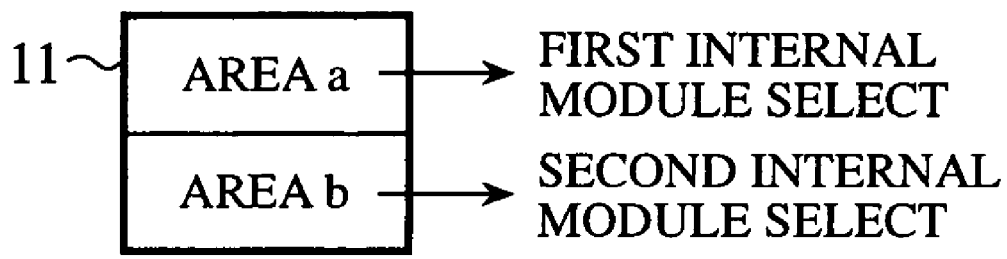
FIG. 16 is a diagram for explaining the address area of a RAM used in the data transfer control apparatus shown in FIG. 15.

Suppose that, as shown in FIG. 16, the address space of the RAM 11 is separated into two areas, the area a and the area b, and the area a is defined as an area to be accessed by the first internal module 61a and the area b is defined as an area to be accessed by the second internal module 61b. The IO selection control section 74 sets the first select signal SELa active when the RAM address signal RADDR specifies the area a, and sets the second select signal SELb active when the RAM address signal RADDR specifies the area b. The definition of an area in the RAM 11 is made by setting a predetermined value in a register (not shown). Changing the content of the register alters arbitrarily the definition of an area in the RAM 11.

The operation of the data transfer control apparatus thus configured as above according to the sixth embodiment of the invention will be described below.

When the transfer control signal output from the bus master 54 is active, the data transfer control apparatus executes data transfer between a plurality of bus slaves (between the RAM 11 and the first internal module 61a or the second internal module 61b) in the same way as the first embodiment, except for the method of selecting between the first internal module 61a and the second internal module 61b. When the transfer control signal is inactive, the data transfer control apparatus executes data transfer between the bus master 54 and a bus slave (the RAM 11, the first internal module 61a or the second internal module 61b) in the same way as the first embodiment. Therefore, the following will discuss only the operation of selecting the first internal module 61a and the second internal module 61b.

If the RAM address signal RADDR sent from the bus master 54 to the RAM address bus 12 of the RAM slave bus 10a via the master bus 51a and the BIU_R 10 specifies the area a in the RAM 11, the IO selection control section 74 renders the first select signal SELa active. This enables a read operation and a write operation to the first internal module 61a.

Likewise, if the RAM address signal RADDR sent from the bus master 54 to the RAM address bus 12 of the RAM slave bus 10a via the master bus 51a and the BIU_R 10 specifies the area b in the RAM 11, the IO selection control section 74 renders the second select signal SELb active. This enables a read operation and a write operation to the second internal module 61b.

As described above, the data transfer control apparatus according to the sixth embodiment switches between selection of the first internal module 61a and selection of the second internal module 61b in accordance with an area in the RAM 11 to be accessed. This data transfer control apparatus can therefore eliminate the need for the setting of a value in the IO selection register which would require three clock cycles (see FIG. 10) in the configuration having an the IO selection register like the data transfer control apparatus according to the third embodiment. This reduces the overhead required to select the first internal module 61a or the second internal module 61b and thus ensures efficient and fast data transfer in fewer clock cycles.

Seventh Embodiment

A data transfer control apparatus according to the seventh embodiment of the invention will then be discussed. The seventh embodiment is, unlike the fourth embodiment, directed to the data transfer control apparatus modified in such a way that the first select signal SELa and the second select signal SELB for selecting the first internal module 61a and the second internal module 61b are generated based on an IO address which is allocated to the first internal module 61a or the second internal module 61b.

Figure 17:
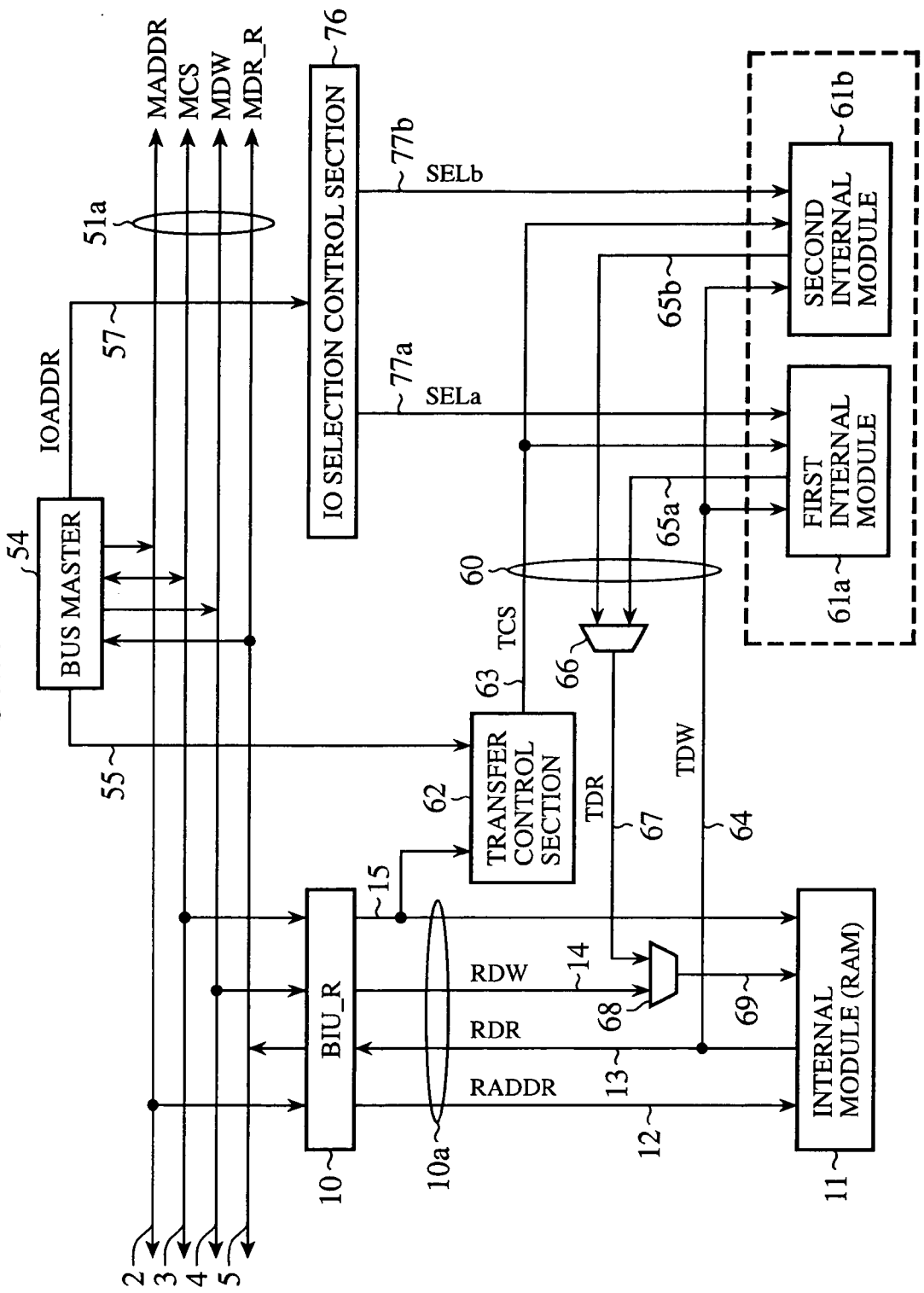
FIG. 17 is a block diagram showing the configuration of a data transfer control apparatus according to a seventh embodiment of the invention.

FIG. 17 is a block diagram showing the configuration of the data transfer control apparatus according to the seventh embodiment of the invention. This data transfer control apparatus is constructed by removing the first select signal line 56a and the second select signal line 56b led out from the bus master 54 of the data transfer control apparatus according to the fourth embodiment shown in FIG. 13 and by adding instead an IO selection control section 76 and an IO address line 57 for sending an IO address signal IOADDR to the IO selection control section 74.

The IO selection control section 76 generates the first select signal SELa for selecting the first internal module 61a or the second select signal SELb for selecting the second internal module 61b based on the IO address signal IOADDR from the bus master 54. The first select signal SELa generated by the IO selection control section 76 is sent to the first internal module 61a over a first select signal line 77a. Likewise, the second select signal SELb is sent to the second internal module 61b over a second select signal line 77b.

Figure 18:
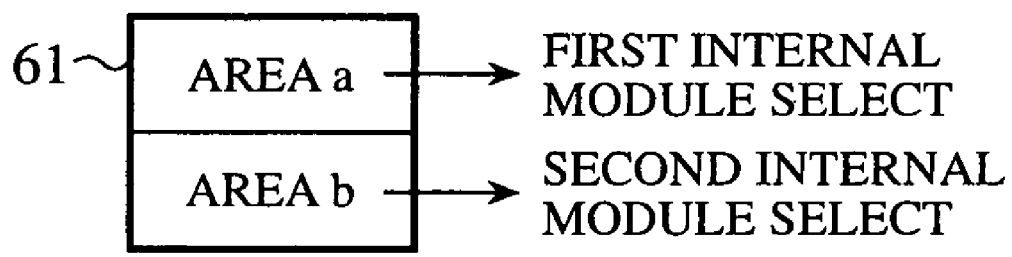
FIG. 18 is a diagram for explaining the address area of an input/output module used in the data transfer control apparatus shown in FIG. 17.

Suppose that, as shown in FIG. 18, the IO address space is separated into two areas, the area a and the area b, and the area a is defined as an area allocated to the first internal module 61a and the area b is defined as an area allocated to the second internal module 61b. The IO selection control section 76 sets the first select signal SELa active when the IO address signal IOADDR specifies the area a, and sets the second select signal SELb active when the IO address signal IOADDR specifies the area b. The definition of an area in the IO address space is made by setting a predetermined value in a register (not shown). Changing the content of the register alters arbitrarily the definition of an area in the IO address space.

The operation of the data transfer control apparatus thus configured as above according to the seventh embodiment of the invention will be described below.

When the transfer control signal output from the bus master 54 is active, the data transfer control apparatus executes data transfer between a plurality of bus slaves (between the RAM 11 and the first internal module 61a or the second internal module 61b) in the same way as the first embodiment, except for the method of selecting between the first internal module 61a and the second internal module 61b. When the transfer control signal is inactive, the data transfer control apparatus executes data transfer between the bus master 54 and a bus slave (the RAM 11, the first internal module 61a or the second internal module 61b) in the same way as the first embodiment. Therefore, the following will discuss only the operation of selecting the first internal module 61*a* and the second internal module 61*b*.

In case where either the first internal module 61*a* or the second internal module 61*b* is to be selected as the target for data transfer, the bus master 54 sends the IO address signal IOADDR representative of an IO address stored in the bus master 54 to the IO selection control section 76 over the IO address line 57. When the received IO address signal IOADDR specifies the area a in the IO address space, the IO selection control section 76 renders the first select signal SELa active. This enables a read operation and a write operation to the first internal module 61*a*.

Likewise, when the received IO address signal IOADDR specifies the area b in the IO address space, the IO selection control section 76 renders the second select signal SELb active. This enables a read operation and a write operation to the second internal module 61*b*.

As described above, the data transfer control apparatus according to the seventh embodiment switches between selection of the first internal module 61*a* and that of the second internal module 61*b* in accordance with an area in the IO address space to be accessed. This data transfer control apparatus can therefore eliminate the need for the setting of a value in the IO selection register which would require three clock cycles (see FIG. 10) in the configuration having an the IO selection register like the data transfer control apparatus according to the third embodiment. This reduces the overhead required to select the first internal module 61*a* or the second internal module 61*b* and thus ensures efficient and fast data transfer in fewer clock cycles.

Figure 19:
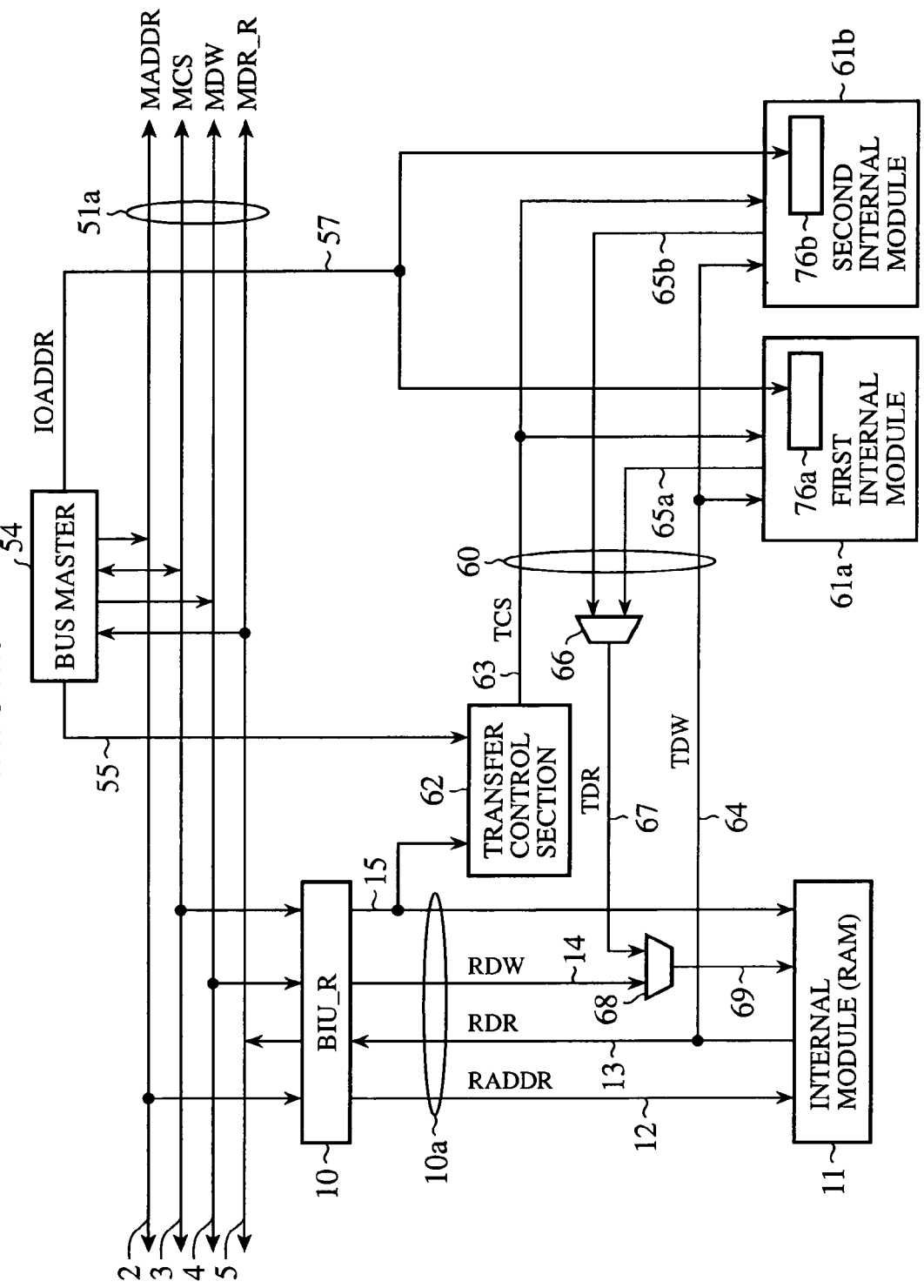
FIG. 19 is a block diagram showing the configuration of a modification of the data transfer control apparatus according to the seventh embodiment of the invention.

The data transfer control apparatus according to the seventh embodiment can be modified as shown in FIG. 19. The data transfer control apparatus according to the modification is constructed by incorporating the functions of the IO selection control section 76 of the data transfer control apparatus shown in FIG. 17 into the first internal module 61*a* and the second internal module 61*b* as an IO selection control section 76*a* and an IO selection control section 76*b*, respectively.

The data transfer control apparatus according to the modification ensures the same operations and advantages as the data transfer control apparatus according to the seventh embodiment.

Eighth Embodiment

A data transfer control apparatus according to the eighth embodiment of the invention will then be discussed. The eighth embodiment is, unlike the fifth embodiment, directed to the data transfer control apparatus modified in such a way that the apparatus has two bus masters and two master buses and the bus masters can access the first internal module 61*a* and the second internal module 61*b* concurrently.

Figure 20:
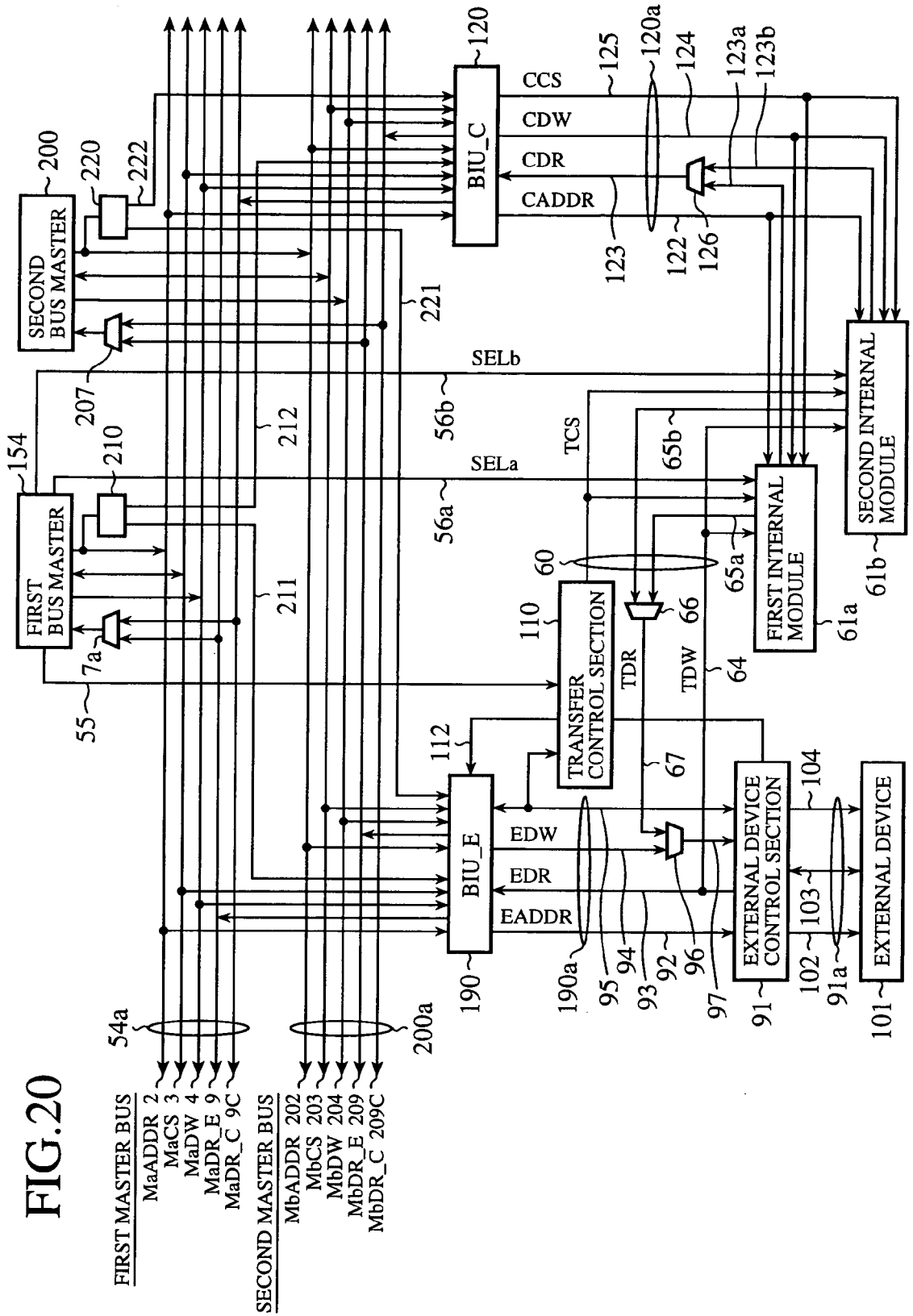
FIG. 20 is a block diagram showing the configuration of a data transfer control apparatus according to an eighth embodiment of the invention.

FIG. 20 is a block diagram showing the configuration of the data transfer control apparatus according to the eighth embodiment of the invention. This data transfer control apparatus is constructed mainly by adding a second bus master 200, a second master bus 200*a*, a bus interface unit (hereinafter referred to as "BIU_C") 120, a selector 7*a*, a selector 207, a selector 126, a first address decoder 210 and a second address decoder 220 to the data transfer control apparatus according to the fifth embodiment shown in FIG. 13.

A first bus master 154 corresponds to the bus master 54 in the fifth embodiment. The first bus master 154 exchanges data with the external device 101 via a first master bus 54*a*, a BIU_E 190 and the external device control section 91 and exchanges data with the first internal module 61*a* or the second internal module 61*b* via the second master bus 200*a* and the BIU_C 120.

The first master bus 54*a* is constituted by adding a read data bus 9C for fetching a second read data signal MaDR_C from the BIU_C 120 to the master bus 51*a* of the fifth embodiment. Namely, the first master bus 54*a* comprises a master address bus 2 for carrying a first master address signal MaADDR, a master control signal bus 3 for carrying a first master control signal MaCS, a master write data bus 4 for carrying a first master write data signal MaDW, a read data bus 9 for fetching a first read data signal MaDR_E from the BIU_C 120 and the aforementioned read data bus 9C.

The selector 7*a* selects either the first read data signal MaDR_E sent over the read data bus 9 or the second read data signal MaDR_C sent over the read data bus 9C and sends the selected signal to the first bus master 154.

The second bus master 200 exchanges data with the external device 101 via the first master bus 54*a*, the BIU_E 190 and the external device control section 91 and exchanges data with the first internal module 61*a* or the second internal module 61*b* via the second master bus 200*a* and the BIU_C 120.

The second master bus 200*a* comprises a plurality of buses corresponding to the first master bus 54*a*. That is, the second master bus 200*a* comprises a master address bus 202 for carrying a second master address signal MbADDR, a master control signal bus 203 for carrying a second master control signal MbCS, a master write data bus 204 for carrying a second master write data signal MbDW, a read data bus 209 for fetching the first read data signal MBDR_E from the BIU_C 120 and a read data bus 209C for fetching a second read data signal MbDR_C from the BIU_C 120.

The selector 207 selects either the first read data signal MbDR_E sent over the read data bus 209 or the second read data signal MbDR_C sent over the read data bus 209C and sends the selected signal to the second bus master 200.

The BIU_E 190 is constructed by adding a function of arbitrating an access from the first bus master 154 and an access from the second bus master 200 to the BIU_E 90 of the data transfer control apparatus according to the fifth embodiment.

The BIU_C 120 arbitrates an access from the first bus master 154 and an access from the second bus master 200 and converts the protocol of the first master bus 54*a* or the protocol of the second master bus 200*a* to the protocol of a bus slave 120*a* for an internal module (hereinafter referred to as "internal module bus slave 120*a*").

The first address decoder 210 determines which address space, the address space of the BIU_E 190 or the address space of the BIU_C 120, the first master address signal MaADDR output from the first bus master 154 specifies. When the first address decoder 210 has determined that the first master address signal MaADDR specifies the address space of the BIU_E 190, an MaBIU_E select signal is sent to the BIU_E 190 over a signal line 211. When the first address decoder 210 has determined that the first master address signal MaADDR specifies the address space of the BIU_C 120, on the other hand, an MaBIU_C select signal is sent to the BIU_C 120 over a signal line 212.

The second address decoder 220 determines which address space, the address space of the BIU_E 190 or the address space of the BIU_C 120, the second master address signal MbADDR output from the second bus master 200 specifies. When the second address decoder 220 has determined that the second master address signal MbADDR specifies the address space of the BIU_E 190, the MaBIU_E select signal is sent to the BIU_E 190 over a signal line 221. When the second address decoder 220 has determined that the second master address signal MbADDR specifies the address space of the BIU_C 120, on the other hand, the MaBIU_C select signal is sent to the BIU_C 120 over a signal line 222.

The BIU_C 120 is connected to the first internal module 61a and the second internal module 61b by the internal module bus slave 120a. The internal module bus slave 120a comprises an internal address bus 122, an internal read data bus 123, an internal write data bus 124 and an internal control signal bus 125.

The internal address bus 122 is used to send an internal address signal CADDR, output from the BIU_C 120, to the first internal module 61a and the second internal module 61b. The internal read data bus 123 is used to send an internal read data signal CDR, read from the first internal module 61a and the second internal module 61b and selected by the selector 126, to the BIU_C 120. The internal write data bus 124 is used to send internal write data CDW, output from the BIU_C 120, to the first internal module 61a and the second internal module 61b. The internal control signal bus 125 is used to send an internal control signal CCS, output from the BIU_C 120, to the first internal module 61a and the second internal module 61b.

The selector 126 selects either read data sent over a signal line 123a from the first internal module 61a or read data sent over a signal line 123b from the second internal module 61b and outputs the selected data to the internal read data bus 123 as the internal read data signal CDR.

The operation of the data transfer control apparatus thus configured as above according to the eighth embodiment of the invention will then be described. First, an access (read operation and write operation) to the first internal module 61a from the first bus master 154 will be discussed.

The first bus master 154 outputs the first select signal SELa to the first select signal line 56a and selects the first internal module 61a first. Then, the first bus master 154 outputs the first master control signal MaCS for an access to the master control signal bus 3. Simultaneously, the first bus master 154 outputs the first master address signal MaADDR needed for an access to the master address bus 2. At the time of a write operation, the first bus master 154 further sends the first master write data signal MaDW to the master write data bus 4.

The first address decoder 210 decodes the first master address signal MaADDR and determines which address space, the address space of the BIU_E 190 or the address space of the BIU_C 120, the signal MaADDR specifies. As it is determined that the address space of the BIU_C 120 is specified, the MaBIU_C select signal is sent to the BIU_C 120 over the signal line 212. Accordingly, the BIU_C 120 is selected.

When the BIU_C 120 selected in this way receives an access request from the first bus master 154, the protocol of the first master bus 54a is converted to the protocol of the internal module bus slave 120a. As a result, the internal address signal CADDR is sent to the internal address bus 122 from the BIU_C 120 and the internal control signal CCS is sent to the internal control signal bus 125. In case of a write operation, further, the internal write data CDW is sent to the internal write data bus 124. The individual signals output to the internal module bus slave 120a are sent to the first internal module 61a.

When the internal control signal CCS specifies a read access, the first internal module 61a reads data from the position that is specified by the internal address signal CADDR and outputs the data onto the signal line 123a. The data output to the signal line 123a is output to the internal read data bus 123 via the selector 126 and is sent to the BIU_C 120 as the internal read data signal CDR. The BIU_C 120 outputs the internal read data signal CDR, as the second read data signal MbDR_C, to the read data bus 209C of the first master bus 54a. The second read data signal MbDR_C is fetched into the first bus master 154 via the selector 7a. Thus, the read operation is completed.

When the internal control signal CCS specifies a write access, on the other hand, the first internal module 61a writes the internal write data CDW, output to the internal write data bus 124, at the position that is specified by the internal address signal CADDR. Thus, a write operation is completed.

An access (read operation and write operation) to the first internal module 61a from the second bus master 200 is executed via the second master bus 200a in the same procedures as have already been discussed above.

Let us consider a case where the first bus master 154 and the second bus master 200 access the address space of the BIU_C 120 concurrently. In this case, the BIU_C 120 is selected by the MaBIU_C select signal sent over the signal line 212 from the first address decoder 210 and is also selected by the MbBIU_C select signal sent over the signal line 222 from the second address decoder 220. The BIU_C 120 performs arbitration to determine which one of an access from the first bus master 154 and an access from the second bus master 200 should be accepted. Available arbitration methods involve a hardware-aided access method whose access priority is fixed and which accepts an access that is given priority from the first bus master 154, another hardware-aided access method whose access priority is fixed and which accepts an access that is given priority from the second bus master 200, and a method which provides a register inside the BIU_C 120 and switching the priority order by setting the register. In case where a hardware-aided access method is employed so as to accept the access that is given priority from the first bus master 154, for instance, an access from the first bus master 154 is accepted first and an access by the second bus master 200 is held until the operation of the first bus master 154 ends. After the operation of the first bus master 154 finishes, an access by the second bus master 200 is accepted.

Through the configuration of the data transfer control apparatus according to the eighth embodiment, while data transfer to the external device 101 from the first internal module 61a is carried out in response to a request from the first bus master 154 as in the operation of the data transfer control apparatus according to the fifth embodiment, the second bus master 200 can access the first internal module 61a via the BIU_C 120 through the above-described operation.

In short, according to the data transfer control apparatus of the eighth embodiment, while data transfer to the external device 101 from the first internal module 61a is carried out in response to a request from the first bus master 154, the second bus master 200 can access the first internal module 61a concurrently with that data transfer. This data transfer control apparatus can therefore reduce the total number of clock cycles for data transfer.

Ninth Embodiment

A data transfer control apparatus according to the ninth embodiment of the invention will then be discussed. The ninth embodiment is, unlike the eighth embodiment, directed to the data transfer control apparatus modified in such a way as to ensure data transfer between a bus master and a bus slave without waiting for the completion of data transfer between plural bus slaves excluding the former bus slave via a transfer bus.

Figure 21:
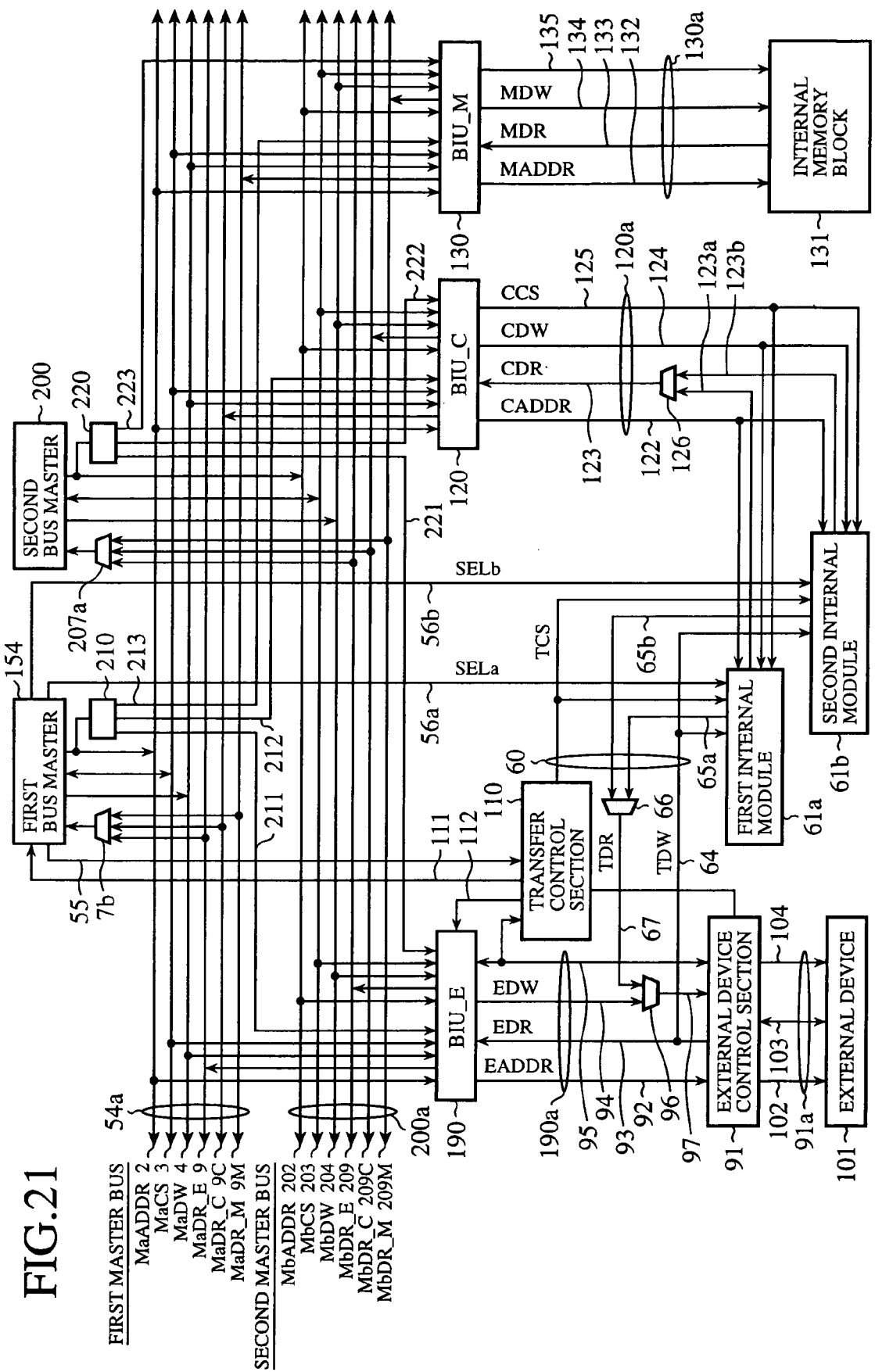
FIG. 21 is a block diagram showing the configuration of a data transfer control apparatus according to a ninth embodiment of the invention.

FIG. 21 is a block diagram showing the configuration of the data transfer control apparatus according to the ninth embodiment of the invention. This data transfer control apparatus is constructed mainly by adding a bus interface unit (hereinafter referred to as "BIU_M") 130 and an internal memory block 131 to the data transfer control apparatus according to the eighth embodiment shown in FIG. 20 and by respectively changing the selector 7a and the selector 207 to a selector 7b and a selector 207a.

The following will discuss what is differed from the data transfer control apparatus according to the eighth embodiment. The first bus master 154 executes data transfer between the internal memory block 131 via the BIU_M 130 in addition to data transfer via the BIU_E 190 and the BIU_C 120. The first master bus 54a is constructed by adding a read data bus 9M for fetching a third read data signal MaDR_M from the BIU_M 130 to the first master bus 54a of the eighth embodiment.

The selector 7b selects one of the first read data signal MADR_E sent over the read data bus 9, the second read data signal MaDR_C sent over the read data bus 9C and the third read data signal MaDR_M sent over the read data bus 9M and sends the selected signal to the first bus master 154.

The second bus master 200 performs data transfer between it and the internal memory block 131 via the BIU_M 130 in addition to data transfer via the BIU_E 190 and the BIU_C 120. The second master bus 200a is constructed by adding a read data bus 209_M for fetching a third read data signal MbDR_M from the BIU_M 130 to the second master bus 200a of the eight embodiment.

The selector 207a selects one of the first read data signal MbDR_E sent over the read data bus 209, the second read data signal MbDR_C sent over the read data bus 209C and the third read data signal MaDR_M sent over the read data bus 209_M and sends the selected signal to the second bus master 200.

The BIU_M 130 arbitrates an access from the first bus master 154 and an access from the second bus master 200 and converts the protocol of the first master bus 54a or the protocol of the second master bus 200a to the protocol of a bus slave 130a for an internal memory (hereinafter referred to as "internal memory bus slave 130a"). The BIU_C 120 is connected to the internal memory block 131 by the internal memory bus slave 130a. The internal memory bus slave 130a comprises an internal memory address bus 132, an internal memory read data bus 133, an internal memory write data bus 134 and an internal memory control signal bus 135.

The internal memory address bus 132 is used to send an internal memory address signal MADDR, output from the BIU_M 130, to the internal memory block 131. The internal memory read data bus 133 is used to send internal memory read data MDR, read from the internal memory block 131, to the BIU_M 130. The internal memory write data bus 134 is used to send internal memory write data MDW, output from the BIU_M 130, to the internal memory block 131. The internal memory control signal bus 135 is used to send an internal memory control signal, output from the BIU_M 130, to the internal memory block 131.

The transfer control section 110 has a capability of sending a transfer instruction acknowledge signal indicating the acknowledgement of a transfer instruction to the first bus master 154 over a signal line 111 and sending a busy signal indicating that data is under transfer to the BIU_E 190 over a signal line 112 in addition to the capabilities of the transfer control section 110 of the eighth embodiment.

The operation of the data transfer control apparatus thus configured as above according to the ninth embodiment of the invention will be described below.

Transfer of data to the external device 101 from the first internal module 61a which is executed in response to a request from the first bus master 154 is performed in the same way as with the fifth embodiment and the eighth embodiment. Upon the first bus master 154 sends a transfer instruction signal to the transfer control section 110 over the transfer instruction line 55, the transfer control section 110 outputs essential control signals to the first internal module 61a and the external device 101 in response to the transfer instruction signal. Simultaneously, the transfer control section 110 sends the transfer instruction acknowledge signal indicative of the acknowledgement of the transfer instruction to the first bus master 154 over the signal line 111 and sends the busy signal indicating that data is under transfer to the BIU_E 190 over the signal line 112. Upon reception of the busy signal, the BIU_E 190 does not accept access requests from the first bus master 154 and the second bus master 200 until the busy signal is disabled. Under this state, data transfer to the external device 101 from the first internal module 61a is carried out.

Based on the transfer instruction acknowledge signal from the transfer control section 110, the first bus master 154 determines that the transfer instruction sent to the transfer control section 110 has been acknowledged and proceeds to the next access. At this time, data transfer from, for example, the second internal module 61b to the internal memory block 131 is possible. The data transfer operation can be achieved by executing a read operation to the second internal module 61b first the first bus master 154 and then by executing a write operation to the internal memory block 131.

According to the data transfer control apparatus of the ninth embodiment, as described above, the first bus master 154 can start a next access, if a transfer instruction request made to the transfer control section 110 is accepted, without waiting for the completion of the data transfer. It is therefore possible to reduce the total number of clock cycles needed for data transfer.

Tenth Embodiment

A data transfer control apparatus according to the tenth embodiment of the invention will then be discussed. The tenth embodiment is, unlike the eighth embodiment, directed to the data transfer control apparatus modified in such a way as to ensure data transfer between a bus master and a bus slave without waiting for the completion of data transfer between plural bus slaves excluding the former bus slave via a transfer bus.

FIG. 22 is a block diagram showing the configuration of the data transfer control apparatus according to the tenth embodiment of the invention. This data transfer control apparatus is constructed by providing a slave bus access acquisition signal line 155, which is connected from the first bus master 154 to the BIU_E 190 and the BIU_C 120, in the data transfer control apparatus according to the eighth embodiment shown in FIG. 20. The first bus master 154 outputs a slave bus access acquisition signal to the slave bus access acquisition signal line 155.

The operation of the data transfer control apparatus thus configured as above according to the tenth embodiment of the invention will be described below. The following will discuss the operation of data transfer to the external device 101 from the first internal module 61a which is executed in response to a request from the first bus master 154. This operation is performed in the same way as with the fifth embodiment, the eighth embodiment and the ninth embodiment. At the time of accessing the BIU_E 190, the first bus master 154 outputs the slave bus access acquisition signal to the slave bus access acquisition signal line 155. The BIU_E 190 is controlled in such a way that once the BIU_E 190 acknowledges an access request from the first bus master 154, the BIU_E 190 does not acknowledge an access request from any bus master other than the first bus master 154. This holds true for the BIU_C 120.

According to the data transfer control apparatus of the tenth embodiment, the first bus master 154 can perform a data read operation or a data write operation while acquiring a bus access to the BIU_E 190 or the BIU_C 120 via the slave bus access acquisition signal, it is possible to prevent the number of clock cycles from being increased due to data transfer based on an access request made from another bus master. This reduces the total number of clock cycles needed for data transfer.

The data transfer control apparatus according to the tenth embodiment can be modified as shown in FIG. 23. The data transfer control apparatus according to the modification is constructed by combining the configuration of the data transfer control apparatus shown in FIG. 22 and that of the data transfer control apparatus according to the ninth embodiment shown in FIG. 21 and separating the first master bus 54a of the ninth and tenth embodiments into a first destination master bus 54b for a destination access (write operation) and a first source master bus 54c for a source access (read operation).

The first bus master 154 has an interface for the first destination master bus 54b and the first source master bus 54c.

The first source master bus 54c includes a source access address bus 2_s, a source access acquisition signal bus 3_s and a source-access slave bus access acquisition signal line 155_s. The source-access slave bus access control acquisition signal line 155_s is connected to the BIU_E 190, BIU_C 120 and BIU_M 130 and is used to send a source-access slave bus access acquisition signal to those components.

Upon reception of a first master address signal MaADDR_s output to the source access address bus 2_s from the first bus master 154, a first source address decoder 210_s determines which one of the address spaces of the BIU_E 190, the BIU_C 120 and the BIU_M 130 is specified by the first bus master 154. When the first source address decoder 210_s determines that the address space of the BIU_E 190 is specified, the MaBIU_E select signal is sent to the BIU_E 190 over a signal line 211_s. When the first source address decoder 210_s determines that the address space of the BIU_C 120 is specified, the MaBIU_C select signal is sent to the BIU_C 120 over a signal line 212_s. When the first source address decoder 210_s determines that the address space of the BIU_M 130 is specified, an MaBIU_M select signal is sent to the BIU_M 130 over a signal line 213_s.

The first destination master bus 54b includes a destination access address bus 2_d, a destination access control signal bus 3_d and a destination-access slave bus access acquisition signal line 155_d. The destination-access slave bus access control acquisition signal line 155_d is connected to the BIU_E 190, BIU_C 120 and BIU_M 130 and is used to send a destination-access slave bus access acquisition signal to those components.

Upon reception of a destination address signal MaADDR_d output to the destination access address bus 2_d from the first bus master 154, a first destination address decoder 210_d determines which one of the address spaces of the BIU_E 190, the BIU_C 120 and the BIU_M 130 is specified by the first bus master 154. When the first destination address decoder 210_d determines that the address space of the BIU_E 190 is specified, the MaBIU_E select signal is sent to the BIU_E 190 over a signal line 211_d. When the first destination address decoder 210_d determines that the address space of the BIU_C 120 is specified, the MaBIU_C select signal is sent to the BIU_C 120 over a signal line 212_d. When the first destination address decoder 210_d determines that the address space of the BIU_M 130 is specified, the MaBIU_M select signal is sent to the BIU_M 130 over a signal line 213_d.

The operation of the data transfer control apparatus according to the modification will be discussed below. The description below will be given of a case where data is transferred to the internal memory block 131 from the first internal module 61a under the control of the first bus master 154.

First, the first bus master 154 reads data from the first internal module 61a via the first source master bus 54c and writes the read data in the internal memory block 131 via the first destination master bus 54b. The repeat of the operation guarantees transfer of a desired number of pieces of data. The operation of reading data from the first internal module 61a and the operation of writing data in the internal memory block 131 are the same as those of the data transfer operation by the first bus master 154 which has been discussed in the foregoing description of the eighth embodiment, except that the source-access slave bus access acquisition signal line and destination-access slave bus access acquisition signal line are used.

At the time of a source access (read operation) to the first internal module 61a by the first bus master 154, the source-access slave bus access acquisition signal is output onto the source-access slave bus access acquisition signal line 155_s to be sent to the BIU_E 190, the BIU_C 120 and the BIU_M 130. The first source address decoder 210_s decodes the first master address signal MaADDR_s and sends the MABIU_C select signal to the BIU_C 120 over the signal line 212_s.

The BIU_C 120 arbitrates a source access request from the first bus master 154, a destination access request from the first bus master 154 and an access request from the second bus master 200 and determines one access request to be accepted. It is assumed here that the destination access request from the first bus master 154 and the access request from the second bus master 200 have not been made.

The BIU_C 120 accepts the source access request from the first bus master 154 or the only access request. Since the source-access slave bus access acquisition signal is output to the source-access slave bus access acquisition signal line 155_s at this time, the bus access to the internal module bus slave 120a which has been given to the first bus master 154 is not released even when a read access operation for one data which is currently in process is finished. The BIU_C 120 accepts the source access request to the first internal module 61a which is subsequently issued from the first bus master 154. At this time, the BIU_C 120 does not accept an access request if made by the second bus master 200.

As the source-access slave bus access acquisition signal is kept output to the source-access slave bus access acquisition signal line 155_s through this operation, the read access operation is repeated a desired number of times. While the read access operation is repeated, the BIU_C 120 does not accept access requests from the other bus masters.

At the time of a destination access (write operation) to the internal memory block 131 from the first bus master 154, the destination-access slave bus access acquisition signal is output to the destination-access slave bus access acquisition signal line 155_d to be sent to the BIU_E 190, the BIU_C 120 and the BIU_M 130. The first destination address decoder 210_d decodes the destination address signal MaD-DR_d output from the first bus master 154 and sends the MaBIU_M select signal to the BIU_M 130 over the signal line 213_d.

The BIU_M 130 arbitrates a source access request from the first bus master 154, a destination access request from the first bus master 154 and an access request from the second bus master 200 and determines one access request to be accepted. It is assumed here that the source access request from the first bus master 154 and the access request from the second bus master 200 have not been made.

The BIU_M 130 accepts the destination access request from the first bus master 154 or the only access request. Since the destination-access slave bus access acquisition signal is output to the destination-access slave bus access acquisition signal line 155_d at this time, the bus access to the internal memory bus slave 130a which has been given to the first bus master 154 is not released even when a write access operation for one data which is currently in process is finished. The BIU_M 130 accepts the destination access request to the internal memory block 131 which is subsequently issued from the first bus master 154. At this time, the BIU_M 130 does not accept an access request if made by the second bus master 200 since the destination-access slave bus access acquisition signal is kept output to the destination-access slave bus access acquisition signal line 155_d through this operation, the write access operation is repeated a desired number of times. While the write access operation is repeated, the BIU_M 130 does not accept access requests from the other bus masters.

Data transfer to the internal memory block 131 from the first internal module 61a is executed under the control of the first bus master 154. While data transfer to the internal memory block 131 from the first internal module 61a is carried out through the above-described operation, the second bus master 200 can access the external device 101 concurrently with that data transfer.

As apparent from the above, the data transfer control apparatus according to the modification of the tenth embodiment can perform a data read operation and a data write operation while acquiring a bus access to the slave bus in each BIU via the slave bus access acquisition signal, it is possible to prevent the number of clock cycles from being increased due to an access request made from another bus master. As a result, data transfer can be achieved in the minimum number of clock cycles.

What is claimed is:

1. A data transfer control apparatus comprising:
  a bus master;
  a bus interface connected to said bus master via a master bus;
  a plurality of bus slaves connected to said bus interface via a slave bus;
  a transfer bus which connects a first bus slave and a plurality of second bus slaves in said plurality of bus slaves, wherein said first bus slave is constituted by an external device control section for controlling an external device connected outside;
  a selection section which outputs a select signal for selecting one of said plurality of second bus slaves;
  a transfer instruction section which outputs a transfer instruction signal for instructing whether or not to execute data transfer via said transfer bus;
  a transfer control section which controls data transfer via said transfer bus between said second bus slave selected by said select signal and said first bus slave in response to a control signal output to said slave bus when an instruction is given by said transfer instruction signal; and
  a second bus interface connected to a second bus master via a second master bus, wherein said second bus master executes data transfer between one of said plurality of second bus slaves via said second bus interface concurrently with data transfer which is carried out via said transfer bus between said second bus slave selected by said select signal and said external device via said external device control section under control of said transfer control section.

2. The data transfer control apparatus according to claim 1, wherein said first bus slave is constituted by a memory, and said transfer instruction section determines whether or not to execute data transfer via said transfer bus in accordance with address space of said memory specified by an address signal output to said slave bus and sends said transfer control section said transfer instruction signal depending on what determination is done.

3. The data transfer control apparatus according to claim 1, wherein said transfer instruction section is included in said bus master which outputs said transfer instruction signal for instructing whether or not to execute data transfer via said transfer bus.

4. The data transfer control apparatus according to claim 3, wherein said selection section is included in said bus master which outputs said select signal for selecting one of said plurality of second bus slaves.

5. The data transfer control apparatus according to claim 4, wherein said transfer control section controls data transfer via said transfer bus between said second bus slave selected by said select signal and said external device via said external device control section in response to a control signal output to said slave bus and information which is output from said external device control section and defines said external device, when said transfer instruction signal instructs execution of data transfer via said transfer bus.

6. The data transfer control apparatus according to claim 1, wherein each of said plurality of second bus slaves is constituted by a plurality of modules respectively allocated to different address spaces, and said selection section outputs a select signal for selecting one of said plurality of modules in accordance with that address space specified by an address signal output to said slave bus.

7. The data transfer control apparatus according to claim 6, wherein said bus master sends said selection section said address signal to specify one of said plurality of modules and said selection section outputs said select signal for selecting one of said plurality of modules in response to said address signal from said bus master.

8. The data transfer control apparatus according to claim 1, wherein said transfer control section inhibits access to said bus interface connected to said first bus slave by sending a busy signal indicative of data transfer in progress to that bus interface when receiving said transfer instruction signal from said bus master, and said bus master executes data transfer to one of said plurality of second bus slaves via said second bus interface without waiting for completion of data transfer being executed to said external device via said transfer bus through said external device control section, after receiving a transfer instruction acceptance signal representative of acceptance of said transfer instruction signal from said transfer control section in response to said transfer instruction signal.

9. The data transfer control apparatus according to claim 1, wherein said bus master supplies said bus interface a slave bus acquisition request signal for acquiring a bus access, and said bus interface which has received said slave bus acquisition request signal executes data transfer between said first bus slave and one of said plurality of second bus slaves without accepting an access request from said bus master or said second bus master.

* * * * *